US012485518B2

(12) United States Patent
Schneider et al.

(10) Patent No.: US 12,485,518 B2
(45) **Date of Patent: *Dec. 2, 2025**

(54) HIGH TORQUE IMPACT TOOL

(71) Applicant: MILWAUKEE ELECTRIC TOOL CORPORATION, Brookfield, WI (US)

(72) Inventors: Jacob P. Schneider, Madison, WI (US); Evan Brown, Milwaukee, WI (US); Leonard Mikat-Stevens, Milwaukee, WI (US); Connor Temme, Medford, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,297

(22) Filed: Mar. 22, 2024

(65) Prior Publication Data

US 2024/0227131 A1 Jul. 11, 2024

Related U.S. Application Data

(63) Continuation of application No. 18/051,226, filed on Oct. 31, 2022, now Pat. No. 11,938,594, which is a (Continued)

(51) Int. Cl.
*B25B 21/02* (2006.01)
*B25B 23/16* (2006.01)

(52) U.S. Cl.
CPC .............. *B25B 21/02* (2013.01); *B25B 23/16* (2013.01)

(58) Field of Classification Search
CPC ....... B25B 21/02; B25B 21/00; B25B 21/026; B25B 23/147; B25B 23/1475;

(Continued)

(56) References Cited

U.S. PATENT DOCUMENTS 2,373,664 A * 4/1945 Emery .................... B25B 21/02 173/93.5
2,373,667 A * 4/1945 Emery ................ B25B 23/1405 173/13

(Continued)

FOREIGN PATENT DOCUMENTS

CN 101186034 A 5/2008
CN 201505880 U 6/2010

(Continued)

OTHER PUBLICATIONS

International Search Report and Written Opinion for Application No. PCT/US2019/068085 dated Apr. 28, 2020 (11 pages).

(Continued)

*Primary Examiner* — Dariush Seif
(74) *Attorney, Agent, or Firm* — Michael Best & Friedrich LLP

(57) ABSTRACT

An impact tool includes a housing including a front housing coupled to a motor housing portion, a motor supported within the motor housing portion, a battery pack supported by the housing for providing power to the motor, the battery pack having a nominal capacity of five Amp-hours and a nominal output voltage of at least 18-Volts, and a drive assembly supported within the housing and configured to convert continuous torque from the motor to consecutive rotational impacts upon a workpiece capable of developing at least 1,700 ft-lbs of fastening torque. The drive assembly includes a camshaft driven by the motor for rotation about an axis, an anvil extending from the front housing, and a hammer configured to reciprocate along a travel portion of the camshaft between a rearmost position and a forwardmost position to deliver rotational impacts to the anvil in response to rotation of the camshaft.

20 Claims, 22 Drawing Sheets

Related U.S. Application Data continuation of application No. 16/723,736, filed on Dec. 20, 2019, now Pat. No. 11,484,997.

(60) Provisional application No. 62/875,656, filed on Jul. 18, 2019, provisional application No. 62/802,858, filed on Feb. 8, 2019, provisional application No. 62/783,673, filed on Dec. 21, 2018.

(58) Field of Classification Search
CPC . B25B 23/1453; B25B 23/1405; B25B 19/00; B25D 11/04; B25D 11/066; B25D 16/00; B25D 16/003; B25D 16/006; B25D 2216/0023; B25F 5/026
USPC ........... 173/117, 90, 91, 93, 94, 128; 81/464
See application file for complete search history.

(56) References Cited

U.S. PATENT DOCUMENTS 2,564,224 A * 8/1951 Mitchell ................. F16D 43/06 81/466
2,825,436 A * 3/1958 Amtsberg ............. B25B 21/026 173/93
2,881,884 A * 4/1959 Amtsberg ............. B25B 21/026 173/93.6
2,973,071 A * 2/1961 Sturrock ............... B25B 21/026 173/93.6
3,068,973 A * 12/1962 Maurer ................... B25B 21/02 477/166
3,070,201 A * 12/1962 Spyridakis ............ B25B 21/026 173/93
3,156,334 A * 11/1964 Hoza ....................... B25B 21/02 192/113.1
3,250,153 A * 5/1966 Purkey ................. B25H 1/0057 408/100
3,352,368 A * 11/1967 Maffey, Jr. .............. B25B 21/00 D8/68
3,362,486 A * 1/1968 Alajouanine ....... B25B 23/1453 173/93.5
3,369,615 A * 2/1968 Maffey, Jr. ............ B25B 21/026 173/93.6
3,398,250 A 8/1968 Bowers
3,467,801 A 9/1969 Matthews
3,606,931 A * 9/1971 Karden ................. B25B 21/026 173/93.5
3,648,784 A * 3/1972 Schoeps ................ B25B 21/026 173/93.5
3,742,364 A 6/1973 Matthews
3,759,334 A * 9/1973 Theurer .................. B23P 19/06 81/464
3,804,180 A * 4/1974 Gelfand .................. B25B 21/02 173/15
4,002,212 A * 1/1977 Schoeps .................. B25B 21/02 173/93.5
4,276,675 A 7/1981 Pioch
4,313,505 A * 2/1982 Silvern ................. B25B 21/026 173/93.5
4,314,782 A * 2/1982 Beekenkamp ....... B25H 1/0078 D15/138
4,459,522 A 7/1984 Huber
4,505,170 A * 3/1985 Van Laere .............. B25B 21/02 81/464
4,523,115 A 6/1985 Cuneo
4,609,053 A * 9/1986 Ragnmark ............. B25D 17/24 173/104
4,619,162 A * 10/1986 Van Laere ................ B25F 3/00 173/104
4,678,871 A 7/1987 Wong
4,719,976 A * 1/1988 Bleicher .............. B25D 16/003 173/205
4,777,393 A 10/1988 Peot
4,790,218 A 12/1988 Cabrera
4,903,318 A 2/1990 Nagata
4,905,423 A * 3/1990 van Laere ............... B25F 5/001 81/464
4,977,966 A 12/1990 Farber et al.
5,049,012 A 9/1991 Cavedo
5,083,358 A * 1/1992 Jones ...................... B25B 23/14 29/525.11
5,092,410 A * 3/1992 Wallace .................. B25B 21/02 81/463
5,111,889 A 5/1992 Neumaier
5,213,017 A 5/1993 Jones et al.
5,269,733 A 12/1993 Anthony, III
D343,345 S 1/1994 Ogawa et al.
5,361,853 A 11/1994 Takamura et al.
5,553,675 A 9/1996 Pitzen et al.
5,687,483 A 11/1997 Neubert et al.
5,747,953 A 5/1998 Philipp
5,792,573 A 8/1998 Pitzen et al.
5,798,584 A 8/1998 Schaeffeler et al.
5,836,403 A * 11/1998 Putney .................... B25B 21/02 173/205
5,888,031 A * 3/1999 Buck ....................... B25F 5/026 408/110
6,013,991 A 1/2000 Philipp
6,104,114 A * 8/2000 Takeda ................... H02K 21/16 310/90
6,112,831 A 9/2000 Gustaffson
6,158,526 A * 12/2000 Ghode .................. B25B 21/026 173/109
6,227,308 B1 5/2001 Ghode et al.
6,317,930 B1 11/2001 Hung
6,457,535 B1 10/2002 Tanaka
6,491,111 B1 * 12/2002 Livingston .............. B25B 21/02 173/93.5
6,546,815 B2 * 4/2003 Yamada .............. B25B 23/1453 73/862.21
6,553,627 B1 4/2003 Horler
6,725,945 B2 * 4/2004 Sugimoto ............... B25B 23/18 173/205
6,733,414 B2 5/2004 Elger
6,786,683 B2 9/2004 Schaer et al.
6,851,343 B2 2/2005 Sasaki
6,935,437 B2 8/2005 Izumisawa
7,032,685 B2 * 4/2006 Nakamizo ........... B25B 23/1453 464/37
7,124,839 B2 * 10/2006 Furuta ..................... B25B 21/00 173/104
7,131,503 B2 * 11/2006 Furuta .................. B25D 16/006 173/112
7,207,393 B2 4/2007 Clark, Jr. et al.
7,259,486 B2 * 8/2007 Yamamoto .......... F04D 29/5806 310/90
7,308,948 B2 * 12/2007 Furuta ................... B25B 21/023 173/48
7,380,613 B2 6/2008 Furuta
7,401,663 B2 7/2008 Craven et al.
7,416,031 B2 * 8/2008 Murakami ............ B25B 21/026 173/128
RE40,681 E 3/2009 Pitzen et al.
D590,681 S 4/2009 Palermo et al.
D591,130 S 4/2009 Palermo et al.
RE40,848 E 7/2009 Pitzen et al.
7,607,492 B2 10/2009 Seith et al.
D606,377 S 12/2009 Ho
7,628,220 B2 12/2009 Barezzani et al.
7,638,958 B2 12/2009 Philipp et al.
7,658,239 B2 * 2/2010 Klemm ................. F16D 43/206 81/473
7,673,702 B2 * 3/2010 Johnson .................. B25B 21/00 173/109
7,823,256 B2 * 11/2010 Engelfried .............. B25F 5/026 16/426
7,905,377 B2 * 3/2011 Krondorfer ............... B25C 1/06 173/90
7,918,286 B2 * 4/2011 Nagasaka ............... B25B 21/02 173/109

(56) References Cited

U.S. PATENT DOCUMENTS 7,934,566 B2 * 5/2011 Hlinka ..................... B25C 1/06 173/90
8,029,510 B2 10/2011 Hoegerle
8,032,990 B2 10/2011 Shinma et al.
8,047,057 B2 * 11/2011 Chen ....................... B25F 5/001 173/217
8,069,929 B2 * 12/2011 Sugimoto ............ B25B 21/026 81/463
8,127,974 B2 * 3/2012 Zhang ....................... B25C 1/06 227/129
8,132,296 B2 3/2012 Di Nicolantonio
8,230,607 B2 7/2012 Limberg et al.
8,272,452 B2 9/2012 Katou et al.
8,371,394 B2 * 2/2013 Grand ..................... B25B 21/02 173/29
8,371,708 B2 * 2/2013 Nagasaka ............... B25B 23/18 173/217
8,381,831 B2 2/2013 Sekino et al.
8,407,860 B2 * 4/2013 Brennenstuhl .......... B25F 5/026 16/422
8,446,120 B2 5/2013 Forster et al.
8,456,113 B2 6/2013 Lexer et al.
8,460,153 B2 * 6/2013 Rudolph ................. B25F 5/001 475/344
8,490,714 B2 * 7/2013 Nakamura .............. B25B 21/00 173/93.5
8,584,770 B2 * 11/2013 Zhang ...................... B23Q 5/04 173/178
8,631,880 B2 * 1/2014 Murthy ................. B25B 21/023 173/93.5
8,636,079 B2 1/2014 Totsu
8,653,787 B2 2/2014 Cunanan et al.
8,657,482 B2 2/2014 Malackowski et al.
8,689,901 B2 4/2014 Chen
8,796,995 B2 8/2014 Cunanan et al.
8,827,003 B2 * 9/2014 Nagasaka ............. B25B 21/023 173/202
8,839,879 B2 9/2014 Elger et al.
8,925,645 B2 * 1/2015 Harada ............... B25B 23/1405 173/9
8,925,646 B2 * 1/2015 Seith ......................... B25F 5/02 173/217
8,961,358 B2 * 2/2015 Hirabayashi .......... B25B 21/008 475/300
8,988,015 B2 3/2015 Forster et al.
9,000,882 B2 4/2015 Velderman et al.
9,071,069 B2 6/2015 Brotto et al.
9,114,514 B2 * 8/2015 Leong ..................... B25B 21/00
9,114,521 B2 * 8/2015 Yoshikawa ............... B25F 5/02
9,205,547 B2 * 12/2015 Hirabayashi ............ B25B 21/02
9,209,642 B2 12/2015 Cunanan et al.
9,225,275 B2 12/2015 Sterling et al.
9,272,400 B2 3/2016 Johnson
9,289,886 B2 3/2016 Limberg et al.
9,308,638 B2 * 4/2016 Kondo ...................... B25F 5/02
9,314,908 B2 4/2016 Tanimoto et al.
9,321,159 B2 * 4/2016 May .................... B25B 23/1475
9,332,987 B2 5/2016 Leimbach et al.
9,351,726 B2 5/2016 Leimbach et al.
9,351,727 B2 5/2016 Leimbach et al.
9,375,206 B2 6/2016 Vidal et al.
9,393,711 B2 * 7/2016 Myrhum, Jr. ............. B26F 1/36
9,401,250 B2 7/2016 Velderman et al.
9,406,457 B2 8/2016 Velderman et al.
9,413,088 B2 8/2016 Brotto et al.
9,415,497 B2 * 8/2016 Hecht .................. B25D 16/003
9,444,269 B2 9/2016 Wohltmann et al.
9,461,379 B2 10/2016 Cunanan et al.
9,463,566 B2 * 10/2016 Yoshikane ................ B25F 5/02
9,508,498 B2 11/2016 Forster et al.
9,559,624 B2 1/2017 Philipp
9,566,692 B2 * 2/2017 Seith ....................... B25B 21/02
9,570,822 B2 2/2017 Cunanan et al.
9,616,558 B2 4/2017 Nishikawa et al.
9,629,623 B2 4/2017 Lytle, IV et al.
9,643,300 B2 5/2017 Kumagai et al.
9,654,050 B2 5/2017 Kokinelis et al.
9,687,230 B2 6/2017 Leimbach et al.
9,692,157 B2 6/2017 Brotto et al.
9,700,337 B2 7/2017 Vidal et al.
9,722,334 B2 8/2017 Sterling et al.
9,743,929 B2 8/2017 Leimbach et al.
9,750,499 B2 9/2017 Leimbach et al.
9,808,244 B2 11/2017 Leimbach et al.
9,815,182 B2 11/2017 Ikuta
9,849,577 B2 * 12/2017 Wyler .................. B25D 11/125
9,883,860 B2 2/2018 Leimbach et al.
9,888,919 B2 2/2018 Leimbach et al.
9,925,653 B2 * 3/2018 Staas ...................... B25D 16/00
9,960,509 B2 5/2018 Sterling et al.
9,966,774 B2 5/2018 Wohltmann et al.
9,975,224 B2 * 5/2018 Tanaka .................... B25B 21/02
10,004,517 B2 6/2018 Philipp
10,027,140 B2 7/2018 Cunanan et al.
10,028,761 B2 7/2018 Leimbach et al.
10,076,340 B2 9/2018 Belagali et al.
D835,959 S 12/2018 Eardley
10,201,364 B2 2/2019 Leimbach et al.
10,238,391 B2 3/2019 Leimbach et al.
10,256,697 B2 4/2019 Velderman et al.
10,286,529 B2 5/2019 Kiyohara et al.
10,295,990 B2 * 5/2019 Dey, IV ................ H04L 67/125
D853,815 S 7/2019 Yaschur et al.
10,414,033 B2 9/2019 Ekstrom et al.
10,456,122 B2 10/2019 Koltz et al.
10,470,762 B2 11/2019 Leimbach et al.
10,517,610 B2 12/2019 Philipp et al.
10,651,706 B2 5/2020 Forster et al.
10,654,153 B2 5/2020 Murakami et al.
10,666,068 B2 5/2020 Cunanan et al.
10,686,319 B2 6/2020 Wohltmann et al.
10,893,867 B2 1/2021 Leimbach et al.
11,076,853 B2 8/2021 Parfett et al.
11,076,866 B2 8/2021 Philipp et al.
11,095,239 B2 8/2021 Delose et al.
11,103,254 B2 8/2021 Irvine
11,259,807 B2 3/2022 Shelton, IV et al.
11,272,909 B2 3/2022 Koltz et al.
11,272,931 B2 3/2022 Boudreaux et al.
11,291,444 B2 4/2022 Boudreaux et al.
11,291,445 B2 4/2022 Shelton, IV et al.
11,298,129 B2 4/2022 Bakos et al.
11,298,130 B2 4/2022 Bakos et al.
11,317,915 B2 5/2022 Boudreaux et al.
11,318,589 B2 5/2022 Schneider et al.
11,331,100 B2 5/2022 Boudreaux et al.
11,331,101 B2 5/2022 Harris et al.
11,357,503 B2 6/2022 Bakos et al.
11,369,377 B2 6/2022 Boudreaux et al.
11,464,511 B2 10/2022 Timm et al.
11,478,842 B1 10/2022 Izutsu et al.
D971,706 S 12/2022 Schneider et al.
11,517,309 B2 12/2022 Bakos et al.
11,522,233 B2 12/2022 Wohltmann et al.
11,522,411 B2 12/2022 Velderman
11,529,669 B2 12/2022 Mizuno et al.
11,554,409 B2 1/2023 Mizuno et al.
11,623,335 B2 4/2023 Wong et al.
11,666,343 B2 6/2023 Philipp et al.
11,738,438 B2 8/2023 Hiller et al.
11,751,872 B2 9/2023 Zeiner et al.
11,858,109 B2 1/2024 Lachica Koch et al.
2001/0004939 A1 * 6/2001 Durmeyer ................. E02D 7/06 173/217
2001/0010268 A1 * 8/2001 Tokunaga ............... B25B 21/02 173/205
2002/0035876 A1 * 3/2002 Donaldson, Jr. .... B25B 23/1456 73/862.21
2005/0000714 A1 1/2005 Milbourne
2005/0121209 A1 * 6/2005 Shimizu .................. B25B 21/00 173/217
2006/0237205 A1 10/2006 Sia et al.

(56) References Cited

U.S. PATENT DOCUMENTS

2007/0000676 A1* 1/2007 Arimura ............. B25B 23/1405 173/179
2007/0209162 A1* 9/2007 McRoberts ............. B25F 5/026 16/426
2007/0267206 A1 11/2007 Chen
2008/0073094 A1 3/2008 Lu
2008/0078067 A1* 4/2008 Nicolantonio .......... B25F 5/026 16/110.1
2008/0099217 A1* 5/2008 Seith ..................... B25B 21/026 173/1
2009/0000434 A1 1/2009 Shinma et al.
2009/0133894 A1* 5/2009 Mizuhara ................ B25F 5/006 310/156.01
2009/0178520 A1 7/2009 Engelfried et al.
2009/0188083 A1 7/2009 Hahn et al.
2009/0188688 A1 7/2009 Gumpert et al.
2009/0188692 A1 7/2009 Hahn et al.
2009/0307875 A1 12/2009 Nakashima et al.
2009/0308628 A1 12/2009 Totsu
2010/0000749 A1* 1/2010 Andel ..................... B25B 21/02 173/202
2010/0005629 A1* 1/2010 Di Nicolantonio ..... B25F 5/026 16/426
2010/0025063 A1* 2/2010 Kuhnapfel ............ B25B 21/026 173/203
2010/0064480 A1 3/2010 Martin
2010/0064481 A1 3/2010 Martin
2010/0064482 A1 3/2010 Martin
2010/0078186 A1* 4/2010 Takeyama ............. B25B 21/026 173/122
2010/0096155 A1* 4/2010 Iwata ...................... B25B 21/02 173/217
2010/0149790 A1 6/2010 Leong
2010/0206595 A1 8/2010 Kamegai
2010/0282484 A1 11/2010 Moessnang et al.
2011/0003541 A1 1/2011 Liu et al.
2011/0011609 A1* 1/2011 Simm ..................... B25F 5/026 173/171
2011/0073334 A1* 3/2011 Iimura .................... B25B 21/02 173/217
2011/0073342 A1 3/2011 Gilsdorf et al.
2011/0079407 A1* 4/2011 Iimura ................ B25B 23/1405 173/217
2011/0120741 A1 5/2011 Limberg et al.
2011/0188232 A1* 8/2011 Friedman .................. F21S 9/04 362/119
2011/0315417 A1* 12/2011 Matsunaga ........... B25B 21/008 173/176
2012/0073846 A1* 3/2012 Hirai ....................... B25B 21/02 173/200
2012/0199372 A1* 8/2012 Nishikawa .............. B25B 21/02 173/132
2012/0234566 A1* 9/2012 Mashiko ................. B25B 21/02 173/93.5
2012/0279736 A1* 11/2012 Tanimoto .............. B25B 21/026 173/117
2012/0292065 A1* 11/2012 Hoshi ..................... B25B 21/02 173/93
2012/0292070 A1* 11/2012 Ito .......................... H02K 11/33 173/217
2012/0312572 A1 12/2012 Nemetz et al.
2012/0318548 A1* 12/2012 Hirabayashi ............ B25B 21/00 173/93.6
2012/0318549 A1* 12/2012 Nagasaka ............... B25F 5/008 173/109
2012/0318550 A1* 12/2012 Tanimoto ............ B25B 23/1475 173/117
2012/0319508 A1* 12/2012 Oomori ................... B25B 21/02 310/50
2013/0000934 A1* 1/2013 Tadokoro ................ B25B 21/00 173/90
2013/0008679 A1* 1/2013 Nishikawa .............. B25B 21/02 173/93
2013/0014967 A1* 1/2013 Ito ............................. B25F 5/00 173/93
2013/0025892 A1* 1/2013 Mashiko ............... B25B 21/026 173/2
2013/0062008 A1 3/2013 Haddad
2013/0062086 A1* 3/2013 Ito ....................... B25B 23/1475 173/1
2013/0062088 A1* 3/2013 Mashiko ................. B25B 21/02 173/48
2013/0075121 A1* 3/2013 Nakamura .............. B25B 21/02 173/94
2013/0087355 A1* 4/2013 Oomori ................... B25B 21/02 173/94
2013/0126202 A1* 5/2013 Oomori ................... B25B 21/00 173/217
2013/0133911 A1* 5/2013 Ishikawa ............... B25B 21/026 173/176
2013/0139614 A1* 6/2013 Johnson ................ B23P 19/066 73/862.21
2013/0161049 A1 6/2013 Ikuta et al.
2013/0206440 A1 8/2013 Ikuta et al.
2013/0228356 A1 9/2013 Hayes et al.
2013/0233584 A1* 9/2013 Mashiko ............. B25B 23/1475 173/181
2013/0270932 A1* 10/2013 Hatfield ................. H02K 3/522 310/50
2013/0270934 A1* 10/2013 Smith ...................... H02K 3/34 310/50
2013/0284480 A1 10/2013 Horie et al.
2013/0333910 A1* 12/2013 Tanimoto ................ B25B 21/02 173/176
2014/0008089 A1* 1/2014 Yeoh ....................... B25B 21/02 173/90
2014/0008090 A1 1/2014 Kokinelis et al.
2014/0014385 A1 1/2014 Kosugi et al.
2014/0069672 A1* 3/2014 Mashiko ................. B25B 21/00 173/47
2014/0124229 A1* 5/2014 Takahashi ............. B25B 21/026 173/93.5
2014/0131059 A1* 5/2014 Verbrugge .............. B25F 5/008 173/217
2014/0138114 A1 5/2014 Takeuchi et al.
2014/0144658 A1 5/2014 Schmid et al.
2014/0145524 A1* 5/2014 Tanimoto ............. H02K 1/2706 310/50
2014/0158388 A1* 6/2014 Johnson .............. B25B 23/0035 173/1
2014/0158390 A1* 6/2014 Mashiko ............... B25B 23/147 173/217
2014/0166324 A1 6/2014 Puzio et al.
2014/0182869 A1* 7/2014 Kumagai ................ B25F 5/008 173/93
2014/0188091 A1 7/2014 Vidal et al.
2014/0196921 A1 7/2014 Kondo et al.
2014/0223695 A1 8/2014 Rieger et al.
2014/0224075 A1* 8/2014 Merrick ................ B25B 13/461 81/52
2014/0231113 A1 8/2014 Steurer
2014/0232326 A1 8/2014 Wohltmann et al.
2014/0251649 A1* 9/2014 Kondo .................... B25F 5/026 16/426
2014/0262396 A1 9/2014 McClung
2014/0262398 A1* 9/2014 Gehret ................. B25D 11/068 173/94
2014/0263541 A1 9/2014 Leimbach et al.
2014/0318821 A1 10/2014 Wyler et al.
2014/0348835 A1 11/2014 Gu et al.
2014/0352114 A1 12/2014 Yoshikane et al.
2014/0371018 A1* 12/2014 Ito ............................ H02K 9/06 475/149
2014/0374130 A1* 12/2014 Nakamura ............ B25B 21/026 173/176
2015/0000946 A1* 1/2015 Amend ................. B25B 21/026 173/93

(56) References Cited

U.S. PATENT DOCUMENTS

2015/0022125 A1* 1/2015 Takano .................. B25F 5/008 318/139
2015/0041163 A1* 2/2015 McClung ............... B25B 21/02 173/176
2015/0041169 A1* 2/2015 Kumagai ............... B25D 17/26 173/93.7
2015/0041170 A1 2/2015 Yoshikane et al.
2015/0047866 A1* 2/2015 Sakai ..................... B25B 21/02 173/217
2015/0075829 A1 3/2015 Seith et al.
2015/0083448 A1* 3/2015 Chen .................. B25B 23/1475 81/464
2015/0083451 A1* 3/2015 Nishikawa ........... B25D 16/006 173/48
2015/0096775 A1* 4/2015 Chen ..................... B25B 21/02 173/1
2015/0097641 A1 4/2015 Chen
2015/0144365 A1* 5/2015 Hirabayashi ........ B25B 23/1405 173/2
2015/0144366 A1 5/2015 Machida
2015/0144368 A1 5/2015 Machida
2015/0151415 A1* 6/2015 Saitou ...................... B25F 5/02 173/93
2015/0158155 A1* 6/2015 Tsubakimoto .......... B25B 21/02 173/93
2015/0165604 A1* 6/2015 Bartoszek ............... B25B 21/02 173/1
2015/0174753 A1 6/2015 Kamiya
2015/0209952 A1* 7/2015 Nishii .................... B25F 5/026 173/162.2
2015/0231770 A1* 8/2015 Kusakawa .......... B25B 23/1475 173/93.5
2015/0231771 A1* 8/2015 Sakai ..................... B25B 21/02 173/176
2015/0266176 A1 9/2015 Takeuchi et al.
2015/0272580 A1 10/2015 Leimbach et al.
2015/0272582 A1 10/2015 Leimbach et al.
2015/0303842 A1* 10/2015 Takano ..................... B25F 5/00 173/2
2015/0328760 A1 11/2015 Ikuta et al.
2015/0333664 A1 11/2015 Bantle
2015/0336249 A1* 11/2015 Iwata .................... B25B 21/026 173/1
2015/0343617 A1* 12/2015 Kondo .................... B25B 21/02 173/93
2015/0352699 A1* 12/2015 Sakai .................... B25B 21/026 173/176
2016/0008961 A1* 1/2016 Takano ............... B25B 23/1475 173/2
2016/0075007 A1 3/2016 Kutsuna et al.
2016/0079887 A1* 3/2016 Takano .................. H02P 1/028 318/431
2016/0107297 A1* 4/2016 Ishikawa ................. B25B 23/18 173/179
2016/0129568 A1* 5/2016 Nishikawa ............ B25B 21/026 173/93
2016/0136801 A1 5/2016 Furusawa et al.
2016/0250743 A1* 9/2016 Kikuchi .................... B25F 5/02 173/46
2016/0263731 A1* 9/2016 Matsumoto ............. B25B 21/02
2016/0279782 A1 9/2016 Ullrich et al.
2016/0288308 A1 10/2016 Kuhnle et al.
2016/0297060 A1 10/2016 Puzio et al.
2016/0311102 A1* 10/2016 Ebner ................. H01M 50/247
2016/0325415 A1* 11/2016 Huber ................. B25B 23/1475
2016/0352699 A1 12/2016 Sinclair et al.
2016/0354905 A1* 12/2016 Ely ....................... B25B 21/008
2017/0021478 A1* 1/2017 Junkers ................. B25B 13/488
2017/0028537 A1* 2/2017 McClung ............ B25B 23/0035
2017/0036327 A1* 2/2017 Murakami .............. B25F 5/006
2017/0057064 A1* 3/2017 Ishikawa ............. B25B 23/1475
2017/0106517 A1 4/2017 Machida
2017/0106525 A1 4/2017 Brauer et al.
2017/0144278 A1* 5/2017 Nishikawa ............ B25B 21/026
2017/0151657 A1* 6/2017 Nagasaka .............. H01H 13/08
2017/0173768 A1* 6/2017 Dey, IV .................. B25B 21/02
2017/0190027 A1* 7/2017 Koizumi ................. H02J 7/345
2017/0190028 A1* 7/2017 Howard ................ B25B 21/026
2017/0190032 A1* 7/2017 Leong ................. B25B 23/1475
2017/0239792 A1 8/2017 Yeoh et al.
2017/0239801 A1* 8/2017 Kondo .................... B25B 21/02
2017/0246732 A1* 8/2017 Dey, IV .................. B25B 21/02
2017/0312902 A1 11/2017 Noguchi et al.
2017/0326712 A1* 11/2017 Li .......................... B25F 5/001
2017/0326720 A1* 11/2017 Kuroyanagi ............ B25F 5/021
2017/0348835 A1* 12/2017 Skelly ................. B25B 23/0078
2018/0001444 A1* 1/2018 Matsushita ............. B25B 23/18
2018/0117745 A1* 5/2018 Murakami ............. B25D 11/04
2018/0200872 A1* 7/2018 Leong ................... B25B 21/002
2018/0215029 A1 8/2018 Steckel
2018/0222022 A1* 8/2018 Kumagai ............. B25D 11/104
2018/0229350 A1 8/2018 Naoi et al.
2018/0236629 A1 8/2018 Gonzalez
2018/0281159 A1 10/2018 Carnesi
2018/0326720 A1 11/2018 Park
2018/0333169 A1 11/2018 Leimbach et al.
2019/0028003 A1* 1/2019 Seith ...................... H02K 21/12
2019/0030622 A1 1/2019 Carlson et al.
2019/0030692 A1* 1/2019 Harada ............... B25B 23/1475
2019/0030696 A1* 1/2019 Seith ....................... B25B 21/02
2019/0224819 A1 7/2019 Kiyohara et al.
2019/0255687 A1* 8/2019 Schneider ............... B25B 21/02
2020/0009709 A1* 1/2020 Kumagai ................ B25B 21/02
2020/0054321 A1 2/2020 Harris et al.
2020/0060713 A1 2/2020 Leimbach et al.
2020/0093506 A1 3/2020 Leimbach et al.
2020/0122281 A1* 4/2020 Wierer ............... B23Q 11/0092
2020/0180124 A1 6/2020 Ellice et al.
2020/0198100 A1* 6/2020 Schneider ............... B25B 21/02
2020/0262037 A1* 8/2020 Schneider ............ B25B 21/026
2021/0094156 A1 4/2021 Chung et al.
2021/0100170 A1 4/2021 Suzuki
2021/0237249 A1 8/2021 Fischer et al.
2021/0252688 A1 8/2021 Nyberg et al.
2021/0252689 A1 8/2021 Gisselman et al.
2021/0260733 A1 8/2021 Fischer et al.
2021/0260734 A1 8/2021 Kubale et al.
2021/0369285 A1 12/2021 Belagali et al.
2022/0134532 A1 5/2022 Merget et al.
2022/0151597 A1 5/2022 Koltz et al.
2022/0160355 A1 5/2022 Harris et al.
2022/0181096 A1 6/2022 Storbjörk et al.
2022/0218381 A1 7/2022 Leimbach et al.
2022/0218382 A1 7/2022 Leimbach et al.
2022/0250216 A1 8/2022 Schneider et al.
2022/0286132 A1 9/2022 Kohls
2022/0397426 A1 12/2022 Nieh et al.
2023/0045811 A1 2/2023 Velderman
2023/0080957 A1 3/2023 Schneider et al.
2023/0202022 A1 6/2023 Ellice et al.
2023/0219207 A1 7/2023 Wong et al.
2024/0269808 A1 8/2024 Schneider et al.
2025/0091181 A1 3/2025 Kubale et al.

FOREIGN PATENT DOCUMENTS

CN 1833827 B 10/2012
CN 202684816 U 1/2013
CN 103532179 A 1/2014
CN 102083593 B 7/2014
CN 203843800 U 9/2014
CN 203944874 U 11/2014
CN 105880685 A 8/2016
CN 106112921 A 11/2016
CN 205881773 U 1/2017
CN 206122746 U 4/2017
CN 206702908 U 12/2017
CN 109500432 A 3/2019
CN 209139897 U 7/2019
CN 209812185 U 12/2019
CN 110840515 A 2/2020
CN 116276826 A 6/2023

(56) References Cited

FOREIGN PATENT DOCUMENTS

| | | | |
|---|---|---|---|
| DE | 19738092 | C1 | 12/1998 |
| DE | 102007039245 | A1 | 5/2008 |
| DE | 102020120195 | A1 | 2/2022 |
| DE | 102020120197 | A1 | 2/2022 |
| EP | 0249037 | B1 | 8/1990 |
| EP | 1036635 | A2 | 9/2000 |
| EP | 2045045 | B1 | 9/2010 |
| EP | 2191941 | B1 | 3/2012 |
| EP | 2599589 | B1 | 6/2013 |
| EP | 2944433 | B1 | 6/2017 |
| EP | 3213870 | A1 | 9/2017 |
| EP | 3706960 | A1 | 9/2020 |
| GB | 965516 | A | 7/1964 |
| GB | 2462992 | A | 1/2010 |
| JP | 2003220569 | A | 8/2003 |
| JP | 2006315119 | A | 11/2006 |
| JP | 2008183691 | A | 8/2008 |
| JP | 2016097498 | A | 5/2016 |
| JP | 2017080853 | A | 5/2017 |
| WO | WO3092964 | A1 | 11/2003 |
| WO | WO2009071376 | A1 | 6/2009 |
| WO | WO2009092486 | A1 | 7/2009 |
| WO | WO2011000509 | A1 | 1/2011 |
| WO | 2011099487 | A1 | 8/2011 |
| WO | WO2013164905 | A1 | 11/2013 |
| WO | 2014208058 | A | 12/2014 |
| WO | WO2016119689 | A1 | 8/2016 |
| WO | WO2017002517 | A1 | 1/2017 |
| WO | WO2021094146 | A1 | 5/2021 |
| WO | WO2021094152 | A1 | 5/2021 |
| WO | WO2021094155 | A1 | 5/2021 |
| WO | WO2021094157 | A1 | 5/2021 |

OTHER PUBLICATIONS

Extended European Search Report for Application No. 19898999.8 dated Oct. 28, 2022 (10 pages).

Beacham, "Best Rotary Hammers," available at <https://bestreviews.com/tools/hammers/best- rotary-hammers> dated Oct. 1, 2021 (2 pages).

Chicago Pneumatic, "Vehicle Service Tools & Workshop Equipment," Catalog dated Dec. 2017 (164 pages).

European Patent Office Action for Application No. 19898999.8 dated Apr. 14, 2025 (6 pages).

Ingersoll Rand, "1" D-Handle Impact Wrench 2850MAX and 2850MAX-6, Informational Flyer, 2018, 2 pages.

Ingersoll Rand, "2850MAX Series Air Impactools ™ - Exploded View", Edition 3, Feb. 2018, 2 pages.

Ingersoll Rand, "2850MAX1" Air Impact Wrench, D-Handle, <https://powertools.ingersollrand.com/en-cn/impact-wrenches/2850max> web page available prior to Dec. 5, 2019 (19 pages).

Ingersoll Rand, "285B Series Air Impact Wrench - Exploded View", Edition 7, Jan. 2014, 2 pages.

Ingersoll Rand, "Air Impact Wrench 2850MAX and 2850MAX-6" Product Information, Edition 3, Feb. 2018, 32 pages.

Ingersoll Rand, "Air Impact Wrench Series 285B and 295A" Product Information, Edition 5, Jan. 2014, 36 pages.

Invalidity Request submitted in Chinese Patent No. 215789519, dated Feb. 24, 2025 (75 pages including English translation).

Makita, "Cordless Impact Wrench," Catalog available as of Jan. 24, 2016 (2 pages).

Musyoka et al., "Best Rotary Hammers: Drill and Chisel More Efficiently," available at <https://www.thedrive.com/reviews/31029/best-rotary-hamer-drill> dated Aug. 20, 2021 (9 pages).

Ruten, "57 brushless DC motor: DC24V 3000rpm 35W brushless DC motor, speed regulating brushless motor" <https://www.ruten.com.tw/item/show?21621759029015=&srsltid=AfmBOopp2dJ3ChR17SRCD pvy4BXAX7z3nf7Yfif9AKAS8KU8DMgGgU_3> web page visited Jan. 10, 2025 (6 pages including English translation).

Third Party Observations submitted in European Application No. 19898999.8 dated Feb. 24, 2025 (9 pages).

Chinese Patent Invalidation Decision for Application No. 201990001262.6 dated Aug. 29, 2025 (35 pages including English translation).

* cited by examiner

HIGH TORQUE IMPACT TOOL

CROSS-REFERENCE TO RELATED APPLICATIONS

This application is a continuation of U.S. patent application Ser. No. 18/051,226, filed Oct. 31, 2022, which is a continuation of U.S. patent application Ser. No. 16/723,736, filed Dec. 20, 2019, now U.S. Pat. No. 11,484,997, which claims priority to U.S. Provisional Patent Application No. 62/783,673, filed Dec. 21, 2018, U.S. Provisional Patent Application No. 62/802,858, filed Feb. 8, 2019, and U.S. Provisional Patent Application No. 62/875,656, filed Jul. 18, 2019, the entire content of each of which is incorporated herein by reference.

FIELD OF THE INVENTION

The present invention relates to power tools, and more specifically to impact tools.

BACKGROUND OF THE INVENTION

Impact tools or wrenches typically include a hammer that impacts an anvil to provide a striking rotational force, or intermittent applications of torque, to a workpiece (e.g., a fastener) to either tighten or loosen the fastener. High torque impact wrenches are capable of delivering very large amounts of torque to fasteners. As such, high torque impact wrenches are typically used to loosen or remove large and/or stuck fasteners (e.g., an automobile lug nut on an axle stud) that are otherwise not removable or very difficult to remove using hand tools, drills, or smaller, lighter-duty impact drivers.

SUMMARY OF THE INVENTION

The present invention provides, in one aspect, an impact tool including a housing extending along a longitudinal axis, the housing including a motor housing portion and a front housing coupled to the motor housing portion, a motor supported within the motor housing portion, a battery pack supported by the housing for providing power to the motor, and a drive assembly supported within the housing and configured to convert continuous torque from the motor to consecutive rotational impacts upon a workpiece capable of developing at least 1,700 ft-lbs of fastening torque. The drive assembly includes a camshaft driven by the motor for rotation about an axis, an anvil extending from the front housing, and a hammer configured to reciprocate along a travel portion of the camshaft between a rearmost position and a forwardmost position to deliver rotational impacts to the anvil in response to rotation of the camshaft.

The present invention provides, in another aspect, an impact tool including a housing extending along a longitudinal axis, the housing including a motor housing portion, a front housing coupled to the motor housing portion, and a D-shaped handle portion disposed rearward of the motor housing portion, a motor supported within the motor housing portion, a battery pack supported by the housing for providing power to the motor, an auxiliary handle assembly including a mount coupled to the front housing portion and an auxiliary handle pivotably couple to the mount, and a drive assembly supported within the housing and configured to convert continuous torque from the motor to consecutive rotational impacts upon a workpiece capable of developing at least 1,700 ft-lbs of fastening torque. The drive assembly including a camshaft driven by the motor for rotation about an axis defined by the camshaft, an anvil extending from the front housing, and a hammer configured to reciprocate along a travel portion of the camshaft between a rearmost position and a forwardmost position to deliver rotational impacts to the anvil in response to rotation of the camshaft.

The present invention provides, in another aspect, an impact tool including a housing extending along a longitudinal axis, the housing including a motor housing portion, a front housing coupled to the motor housing portion, a motor supported within the motor housing portion, a battery pack supported by the housing for providing power to the motor, and a drive assembly supported within the housing and configured to convert continuous torque from the motor to consecutive rotational impacts upon a workpiece capable of developing at least 1,700 ft-lbs of fastening torque. The drive assembly including a camshaft driven by the motor for rotation about an axis defined by the camshaft, an anvil extending from the front housing, and a hammer configured to reciprocate along a travel portion of the camshaft between a rearmost position and a forwardmost position to deliver rotational impacts to the anvil in response to rotation of the camshaft. The drive assembly provides the fastening torque without drawing more than 100 Amperes.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
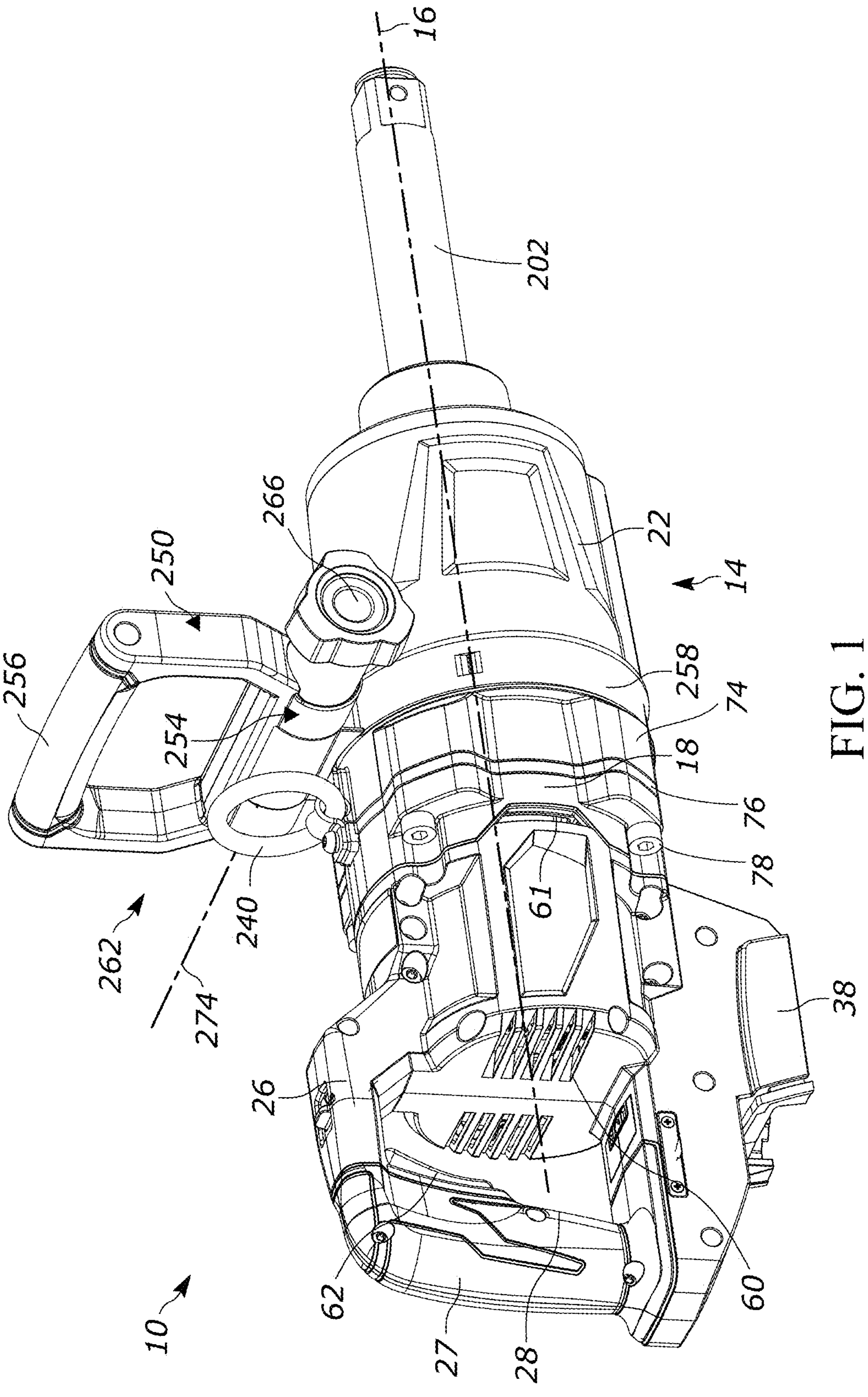
FIG. 1 is a perspective view of an impact wrench according to one embodiment.

FIG. 1 illustrates a power tool in the form of an impact tool or impact wrench 10. The impact wrench 10 includes a housing 14 extending along a longitudinal axis 16. The housing 14 includes a motor housing portion 18, a front housing portion 22 coupled to the motor housing portion 18, and a generally D-shaped handle portion forming a first handle 26 disposed rearward of the motor housing portion 18. The handle portion 26 has a grip 27 that can be grasped by a user operating the impact wrench 10. The grip 27 is spaced from the motor housing portion 18 such that an aperture 28 is defined between the grip 27 and the motor housing portion 18.

The impact wrench 10 may be powered by a battery pack (not shown) removably coupled to a battery receptacle 38 located at a bottom end of the handle portion 26. The battery pack may include a plurality of rechargeable battery cells electrically connected to provide a desired output (e.g., nominal voltage, current capacity, etc.) of the battery pack. Each battery cell may have a nominal voltage between about 3 Volts (V) and about 5 V. The battery pack may have a nominal capacity of at least 5 Amp-hours (Ah) (e.g., with two strings of five series-connected battery cells (a "5S2P" pack)). In some embodiments, the battery pack may have a nominal capacity of at least 9 Ah (e.g., with three strings of five series-connected battery cells (a "5S3P pack"). The illustrated battery pack may have a nominal output voltage of at least 18 V. The cells may have a Lithium-based chemistry (e.g., Lithium, Lithium-ion, etc.) or any other suitable chemistry.

Figure 2:
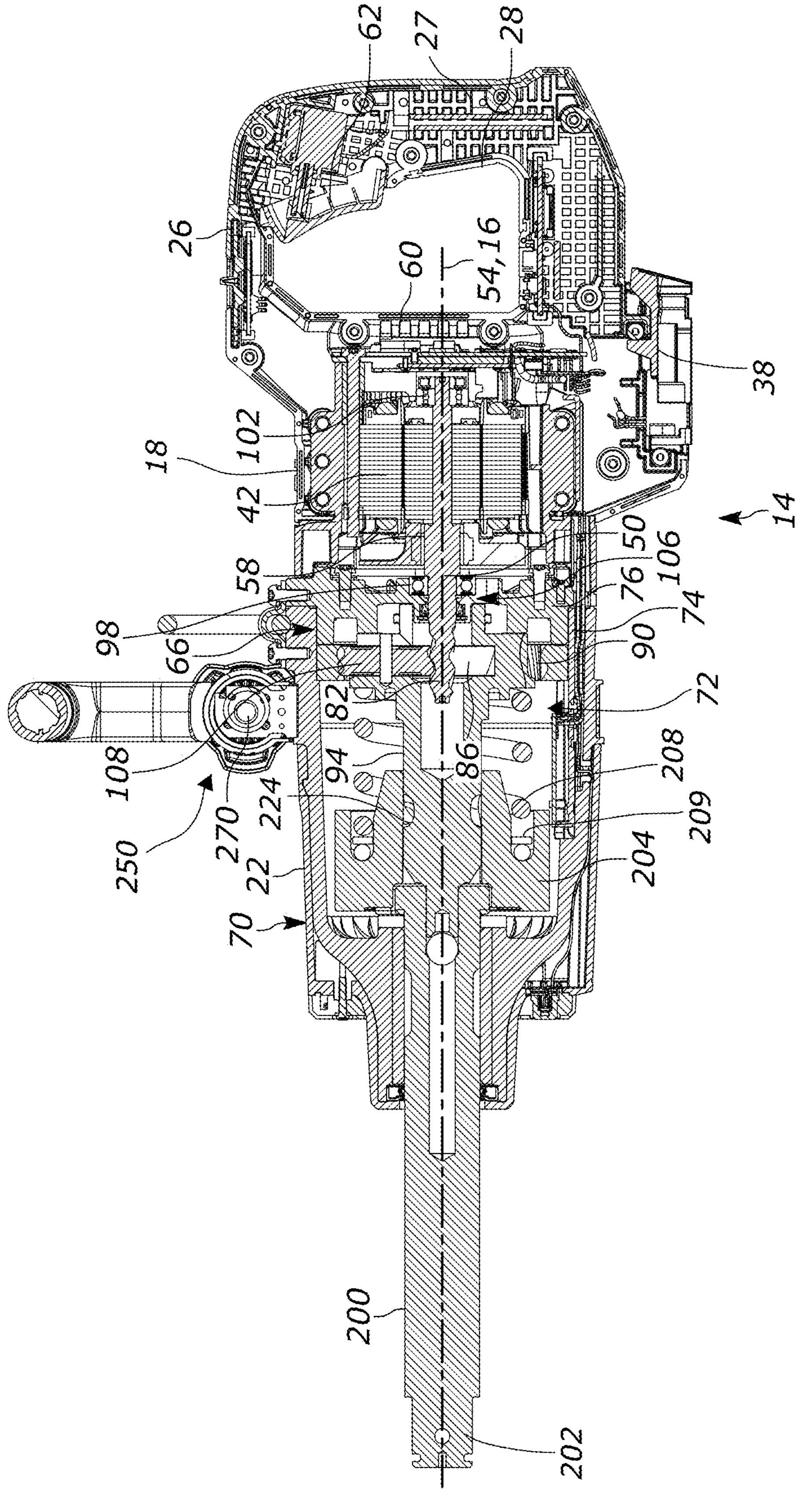
FIG. 2 is a cross-sectional view of the impact wrench of FIG. 1.

Referring to FIG. 2, an electric motor 42, supported within the motor housing portion 18, receives power from the battery pack when the battery pack is coupled to the battery receptacle 38. The motor 42 is preferably a brushless direct current ("BLDC") motor with an output shaft 50 that is rotatable about an axis 54. In the illustrated embodiment, the axis 54 is coaxial with the longitudinal axis 16 of the housing 14, such that the impact wrench 10 has an in-line configuration. A fan 58 is coupled to the output shaft 50 (e.g., via a splined connection) in front of the motor 42. The fan 58 is configured to draw cooling air in through inlet openings 60 (FIG. 1) in the handle portion 26, which, in the illustrated embodiment, are positioned along a front periphery of the aperture 28. The fan 58 conveys the cooling air through the motor housing portion 18 and past the motor 42 in a forward direction parallel to the axes 16, 54. The cooling air is then redirected radially outward by the fan 58 through exhaust openings 61 (FIG. 1) in the motor housing portion 18.

The impact wrench 10 includes a trigger switch 62 provided on the first handle 26 to selectively electrically connect the motor 42 and the battery pack 34 and thereby provide DC power to the motor 42. In other embodiments, the impact wrench 10 may include a power cord for electrically connecting the switch 62 and the motor 42 to a source of AC power. As a further alternative, the impact wrench 10 may be configured to operate using a different power source (e.g., a pneumatic power source, etc.). The battery pack 34 is the preferred means for powering the impact wrench 10, however, because a cordless impact wrench advantageously requires less maintenance (e.g., no oiling of air lines or compressor motor) and can be used in locations where compressed air or other power sources are unavailable.

Figure 3:
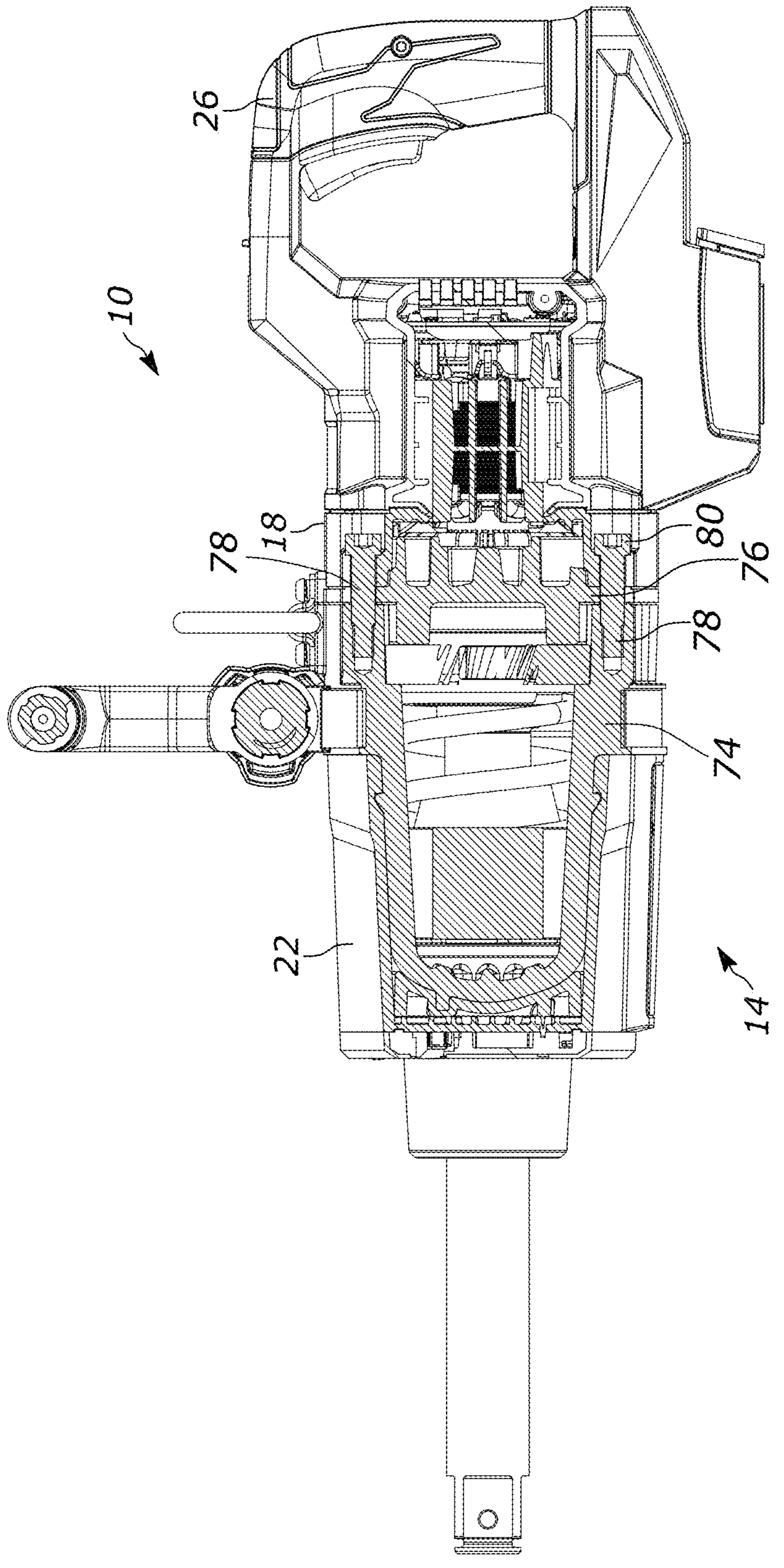
FIG. 3 is another cross-sectional view of the impact wrench of FIG. 1.

With reference to FIGS. 2 and 3, the impact wrench 10 further includes a gear assembly 66 coupled to the motor output shaft 50 and an impact mechanism 70 coupled to an output of the gear assembly 66 (FIG. 2). The gear assembly 66 and the impact mechanism 70 form a drive assembly 72 of the impact wrench 10.

The gear assembly 66 is at least partially housed within a gear case 74 fixed to the housing 14. In particular, in the illustrated embodiment, the gear case 74 includes a flange portion 76 positioned between the front housing portion 22 and the motor housing portion 18 and fixed to the front housing portion 22 and the motor housing portion 18 by a plurality of fasteners 78 (FIG. 3). The fasteners 78 extend in a forward direction in the illustrated embodiment (that is, the heads 80 of the fasteners 78 face rearward), but the fasteners 78 may be arranged differently in other embodiments. The gear case 74 is preferably made of a high-strength material, such as steel or aluminum, in order to resist high torque loads delivered by the motor 42 through the gear assembly 66. In some embodiments, the gear case 74 and the front housing portion 22 may collectively define a front housing of the impact wrench 10.

With reference to FIG. 2, the gear assembly 66 may be configured in any of a number of different ways to provide a speed reduction between the output shaft 50 and an input of the impact mechanism 70. The illustrated gear assembly 66 includes a helical pinion 82 formed on the motor output shaft 50, a plurality of helical planet gears 86 meshed with the helical pinion 82, and a helical ring gear 90 meshed with the planet gears 86 and rotationally fixed to the gear case 74. The planet gears 86 are mounted on a camshaft 94 of the impact mechanism 70 such that the camshaft 94 acts as a planet carrier. Accordingly, rotation of the output shaft 50 rotates the planet gears 86, which then advance along the inner circumference of the ring gear 90 and thereby rotate the camshaft 94. The gear assembly 66 may provide a gear ratio from the output shaft 50 to the camshaft 94 between 10:1 and 14:1, for example.

The output shaft 50 is rotatably supported by a first or forward bearing 98 and a second or rear bearing 102. The helical gears 82, 86, 90 of the gear assembly 66 advantageously provide higher torque capacity and quieter operation than spur gears, for example, but the helical engagement between the pinion 82 and the planet gears 86 produces an axial thrust load on the output shaft 50. Accordingly, the impact wrench 10 includes a front bearing retainer 106 that secures the front bearing 98 both axially (i.e. against forces transmitted along the axis 54) and radially (i.e. against forces transmitted in a radial direction of the output shaft 50). In the illustrated embodiment, the front bearing 98 is seated within a recess in the flange portion 76 of the gear case 74.

The impact mechanism 70 of the impact wrench 10 will now be described with reference to FIG. 2. The illustrated impact mechanism 70 includes an anvil 200 extending from the front housing portion 22. A tool element (e.g., a socket; not shown) can be coupled to the anvil 200 for performing work on a workpiece (e.g., a fastener). In the illustrated embodiment, the anvil 200 includes a 1-inch square drive end 202. The impact mechanism 70 is configured to convert the continuous rotational force or torque provided by the motor 42 and gear assembly 66 to a striking rotational force or intermittent applications of torque to the anvil 200 when the reaction torque on the anvil 200 (e.g., due to engagement between the tool element and a fastener being worked upon) exceeds a certain threshold. In the illustrated embodiment of the impact wrench 10, the impact mechanism 70 includes the camshaft 94, a hammer 204 supported on and axially slidable relative to the camshaft 94, and the anvil 200.

The impact mechanism 70 further includes a spring 208 biasing the hammer 204 toward the front of the impact wrench 10 (i.e., in the left direction of FIG. 2). In other words, the spring 208 biases the hammer 204 in an axial direction toward the anvil 200, along the longitudinal axis 16. A thrust bearing 209 (e.g., including a washer and a plurality of ball bearings) is positioned between the spring 208 and the hammer 204 to allow the spring 208 and the camshaft 94 to continue to rotate relative to the hammer 204 after each impact strike when lugs (not shown) on the hammer 204 engage with corresponding lugs (not shown) on the anvil 200 and rotation of the hammer 204 momentarily stops. The camshaft 94 further includes cam grooves 224 in which corresponding cam balls (not shown) are received. The cam balls are in driving engagement with the hammer 204 and movement of the cam balls within the cam grooves 224 allows for relative axial movement of the hammer 204 along the camshaft 94 when the hammer lugs and the anvil lugs are engaged and the camshaft 94 continues to rotate.

The impact wrench 10 is capable of applying a large fastening torque to a fastener. As defined herein, the term "fastening torque" means torque applied to a fastener in a direction increasing tension (i.e. in a tightening direction). In particular, the drive assembly 72 of the impact wrench 10 converts the continuous torque input from the motor 42 (via the gear assembly 66 and the impact mechanism 70) to deliver consecutive rotational impacts on a workpiece producing at least 1,700 ft-lbs of fastening torque without exceeding 100 Amps (A) of current drawn by the motor 42. In some embodiments, the drive assembly 72 delivers consecutive rotational impacts on a workpiece, producing at least 1,700 ft-lbs of fastening torque without exceeding 80 A of current drawn by the motor 42.

In some embodiments, the drive assembly 72 delivers consecutive rotational impacts on a workpiece, producing at least 1,800 ft-lbs of fastening torque without exceeding 100 A of current drawn by the motor 42. In some embodiments, the drive assembly 72 delivers consecutive rotational impacts on a workpiece, producing at least 1,800 ft-lbs of fastening torque without exceeding 80 A of current drawn by the motor 42.

In some embodiments, the drive assembly 72 delivers consecutive rotational impacts on a workpiece, producing at least 1,900 ft-lbs of fastening torque without exceeding 100 A of current drawn by the motor 42. In some embodiments, the drive assembly 72 delivers consecutive rotational impacts on a workpiece, producing at least 1,900 ft-lbs of fastening torque without exceeding 80 A of current drawn by the motor 42.

In some embodiments, the drive assembly 72 delivers consecutive rotational impacts on a workpiece, producing at least 2,000 ft-lbs of fastening torque without exceeding 100 A of current drawn by the motor 42. In some embodiments, the drive assembly 72 delivers consecutive rotational impacts on a workpiece, producing at least 2,000 ft-lbs of fastening torque without exceeding 80 A of current drawn by the motor 42. In some embodiments, the drive assembly 72 delivers consecutive rotational impacts on a workpiece, producing at least 3,500 ft-lbs of fastening torque.

Referring to FIG. 1, the impact wrench 10 includes a hook ring 240 coupled to the housing 14. In some embodiments, the hook ring 240 may be fastened directly to the gear case 74 and/or flange portion 76. The hook ring 240 may provide an attachment point for a harness, lanyard, or the like. The illustrated impact wrench 10 further includes an auxiliary handle assembly or second handle assembly 250 coupled to the housing 14.

The illustrated auxiliary handle assembly 250 includes a mount 254, an auxiliary handle 256 coupled to the mount 254, and an adjustment mechanism 262 for adjusting a position of the auxiliary handle 256 relative to the housing 14. The illustrated mount 254 includes a band clamp 258 that surrounds the front housing portion 22. The illustrated auxiliary handle 256 is a generally U-shaped handle with a central grip portion. In some embodiments, the central grip portion may be covered by an elastomeric overmold.

The adjustment mechanism 262 includes an actuator 266 that is coupled to a threaded rod 270 (FIG. 2). Rotation of the actuator 266 about an axis 274 in a loosening direction permits adjustment of the auxiliary handle assembly 250. In particular, the auxiliary handle 256 may be rotatable relative to the mount 254 about the axis 274, which is perpendicular to the longitudinal axis 16 of the housing 14. In some embodiments, loosening the adjustment mechanism 262 may also loosen the band clamp 258 to permit rotation of the auxiliary handle assembly 250 about the longitudinal axis 16. Rotation of the actuator 266 about the axis 274 in a tightening direction clamps the auxiliary handle assembly 250 and/or the auxiliary handle 256 in a desired orientation.

In operation of the impact wrench 10, an operator grasps the first handle 26 with one hand and the second handle 250 with the other. The operator depresses the trigger switch 62 to activate the motor 42, which continuously drives the gear assembly 66 and the camshaft 94 via the output shaft 50. As the camshaft 94 rotates, the cam balls 228 drive the hammer 204 to co-rotate with the camshaft 94, and the hammer lugs engage, respectively, driven surfaces of the anvil lugs 220 to provide an impact and to rotatably drive the anvil 200 and the tool element. After each impact, the hammer 204 moves or slides rearward along the camshaft 94, away from the anvil 200, so that the hammer lugs disengage the anvil lugs 220. As the hammer 204 moves rearward, the cam balls situated in the respective cam grooves 224 in the camshaft 94 move rearward in the cam grooves 224. The spring 208 stores some of the rearward energy of the hammer 204 to provide a return mechanism for the hammer 204. After the hammer lugs 218 disengage the respective anvil lugs 220, the hammer 204 continues to rotate and moves or slides forwardly, toward the anvil 200, as the spring 208 releases its stored energy, until the drive surfaces of the hammer lugs re-engage the driven surfaces of the anvil lugs 220 to cause another impact.

The auxiliary handle assembly 250 advantageously gives the operator improved control when operating the impact wrench 10 by allowing the operator to stabilize and support the front housing portion 22, and to hold the impact wrench 10 in a manner where the operator can better absorb axial vibration created by the reciprocating hammer 204. Because the auxiliary handle assembly 250 is adjustable, the operator can position the auxiliary handle 256 in a variety of different orientations for improved comfort, ergonomics, and to increase the usability of the impact wrench 10 in tight spaces.

Figure 4A:
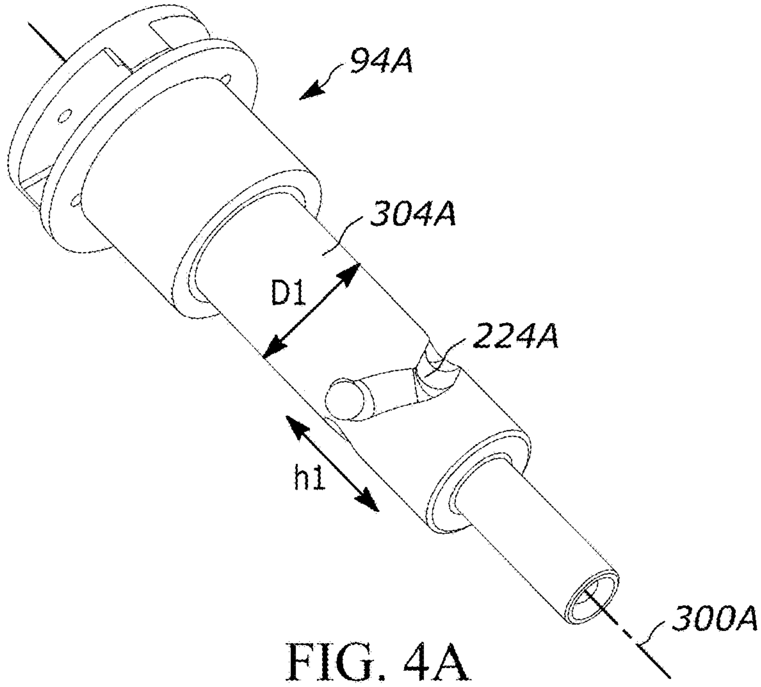
FIG. 4A is a perspective view of a camshaft according to a first embodiment and usable with the drive assembly of FIG. 3.

FIG. 4A illustrates a camshaft 94A according to a first embodiment, usable with the impact mechanism 70 of FIG. 2. The camshaft 94A defines a longitudinal axis 300A and includes a travel portion 304A in which the cam grooves 224A are formed. In the illustrated embodiment, the travel portion 304A has a diameter D1 of about 24 millimeters (mm).

Figure 4B:
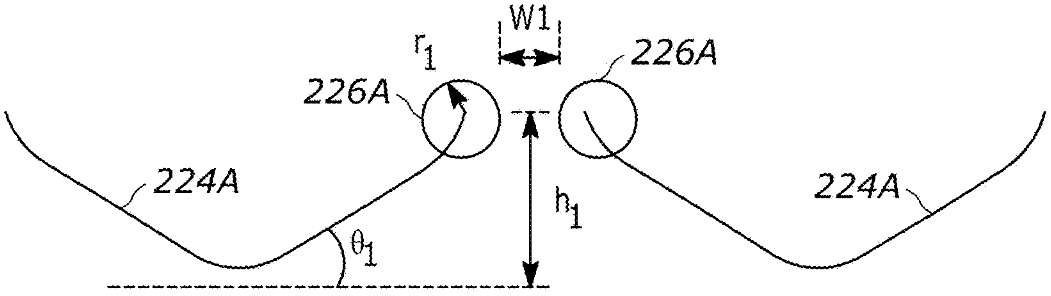
FIG. 4B is a diagram illustrating geometry of a cam groove of the camshaft of FIG. 4A.

Referring to FIG. 4B, the cam grooves 224A are sized to accommodate one or more cam balls 226A having a radius r1 of about 3.95 mm. The cam grooves 224A each define a cam angle θ1 of about 31.2 degrees (relative to a plane transverse to the longitudinal axis 300A). The grooves 224A define an axial distance h1 that the balls 226A can travel along the grooves 224A. The distance h1 is a function of the diameter D1 of the travel portion 304A, the radius r1 of the cam ball 226A, and the cam angle θ1 of the grooves 224A.

Figure 4C:
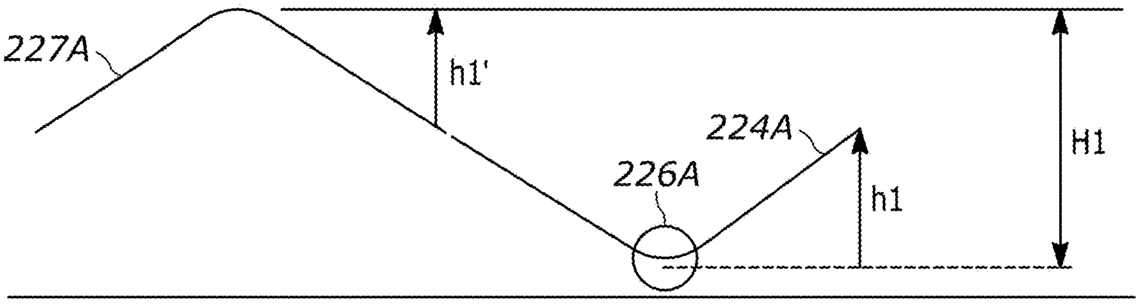
FIG. 4C is a diagram illustrating total axial hammer travel provided by the camshaft of FIG. 4A.

With reference to FIG. 4C, the hammer 204 includes grooves 227A that are likewise sized to accommodate the cam balls 226A. Like the grooves 224A in the camshaft 94A, the grooves 227A define an axial distance h1' that the balls 226A can travel along the grooves 227A. The sum of the distance h1 and the distance h1' defines a total axial travel H1 of the hammer 204.

In the illustrated embodiment, the total axial travel H1 is about 16 mm. That is, the hammer 204 is axially movable a distance of about 16 mm along the travel portion 304A during operation of the impact wrench 10. In some embodiments, the impact mechanism 70 including the camshaft 94A may provide between 18 and 30 joules of energy to the anvil 200 per impact.

In some embodiments, it may be desirable to configure the drive assembly 72 of the impact wrench 10 for higher torque output. This may be accomplished by increasing the mass of the hammer 204 and/or increasing the rotational speed of the hammer 204 to provide increased kinetic energy at the point of impact. This increased energy must be stored in the spring 208 of the impact mechanism 70. The maximum potential energy (PE) stored in the spring 208 is defined by Equation 1, where "K" is the spring constant, "$x_{free}$" is the unloaded length of the spring 208, "$x_{preload}$" is the assembled length of the spring 208 within the drive assembly 72, and "H" is the total hammer axial travel:

$$PE_{spring\ max} = \frac{1}{2}K(x_{free} - x_{preload} - H)^2 \qquad \text{Equation 1}$$

The spring constant K of the spring 208 cannot be increased greatly without impeding the periodic impacting operation of the hammer 204. Accordingly, to increase the energy stored by the spring 208, the total hammer axial travel H must be increased.

There are a variety of changes that could be made to the camshaft 94A to increase the hammer travel H1. For example, the radius r1 of the cam balls 226A could be decreased. However, the inventors found that decreasing the radius r1 of the cam balls 226A increases stresses in the cam balls 226A and increases contact stresses on the cam grooves 224A. Alternatively, the cam angle θ1 could be increased. However, the inventors found that increasing total hammer axial travel H1 by increasing the cam angle θ1 would result in higher axial acceleration of the hammer 204, which increases vibration and wear on the drive assembly 72 as well as current drawn by the motor 42. Accordingly, the inventors discovered that a preferred method for increasing total hammer axial travel H1 includes increasing the diameter D1 of the travel portion 304A.

Figure 5A:
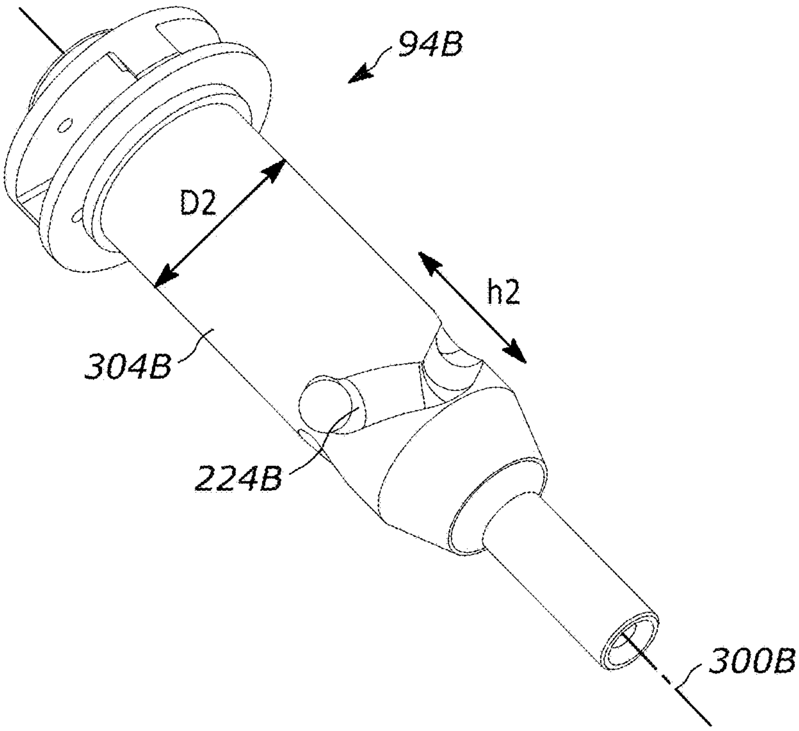
FIG. 5A is a perspective view of a camshaft according to a second embodiment and usable with the drive assembly of FIG. 3.

FIG. 5A illustrates a camshaft 94B according to a second embodiment, usable with the impact mechanism 70 of FIG. 2. The camshaft 94B is configured to provide the impact wrench 10 with a higher torque capacity than the camshaft 94A, for example, while maintaining durability and minimizing current draw on the motor 42. In some embodiments, the impact mechanism 70 including the camshaft 94B may provide between 40 and 73 joules of energy to the anvil 200 per impact.

The camshaft 94B defines a longitudinal axis 300B and includes a travel portion 304B in which the cam grooves 224B are formed. The travel portion 304B may have a diameter D2 of at least 30 mm in some embodiments. In the illustrated embodiment, the travel portion 304B has a diameter D2 of about 33 mm. In other embodiments, the travel portion 304B has a diameter D2 between 20 millimeters and 40 millimeters. In other embodiments, the travel portion 304B has a diameter D2 between 25 millimeters and 40 millimeters. In other embodiments, the travel portion 304B has a diameter D1 between 30 millimeters and 40 millimeters.

Figure 5B:
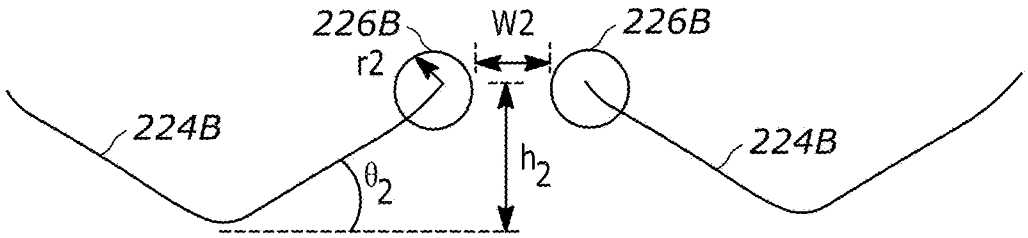
FIG. 5B is a diagram illustrating a geometry of a cam groove of the camshaft of FIG. 5A.

Referring to FIG. 5B, the cam grooves 224B are sized to accommodate one or more cam balls 226B having a radius r2 of about 4.76 mm. The cam grooves 224B each define a cam angle θ2 of about 31.2 degrees (i.e. the same as the cam angle θ1). The grooves 224B define an axial distance h2 the balls 226B can travel along the grooves 224B. The distance h2 is a function of the diameter D2 of the travel portion 304B, the radius r2 of the cam balls 226B, and the cam angle θ2 of the grooves 224B.

Figure 5C:
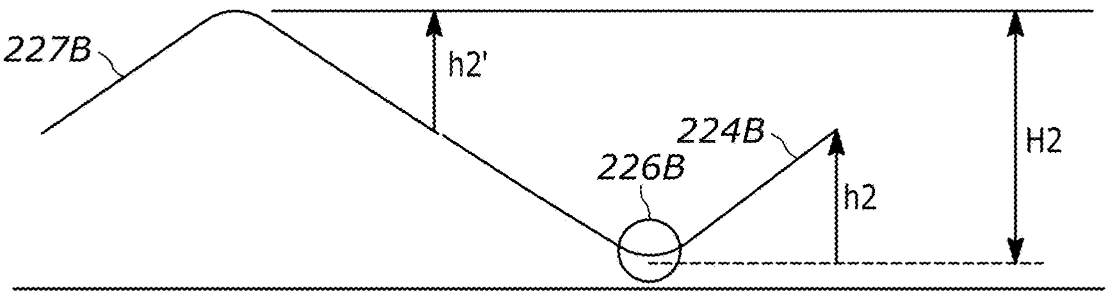
FIG. 5C is a diagram illustrating total axial hammer travel provided by the camshaft of FIG. 5A.

With reference to FIG. 5C, the hammer 204 includes grooves 227B that are likewise sized to accommodate the cam balls 226B. Like the grooves 224B in the camshaft 94B, the grooves 227B define an axial distance h2' that the balls 226B can travel along the grooves 227B. The sum of the distance h2 and the distance h2' defines a total axial travel H2 of the hammer 204.

The larger diameter D2 of the travel portion 304B increases the total hammer axial travel H2 compared to the total hammer axial travel H1. In some embodiments, the total hammer axial travel H2 is at least 20.75 mm. In the embodiment illustrated in FIG. 5C, the total hammer axial travel H2 is about 22 mm. That is, the hammer 204 is axially movable a distance of about 22 mm along the travel portion 304B during operation of the impact wrench 10.

The greater hammer axial travel distance H2 provided by the camshaft 94B allows for more energy to be stored in the spring 208 compared to the camshaft 94A; however, the larger diameter D2 of the travel portion 304B may increase the mass of the camshaft 94B. Various embodiments are described herein for reducing the mass of the camshaft 94B, while maintaining the relatively large travel portion diameter D2 and corresponding hammer travel distance H2. However, the embodiments described herein are equally applicable to camshafts of other impact tools. In addition, the features and elements of the embodiments described herein may be combined in various ways to further reduce the mass of the camshaft 94B, to an extent limited by part strength requirements. For example, the mass of the camshaft 94B may be between 0.5 kg and 1.0 kg in some embodiments.

Figure 6:
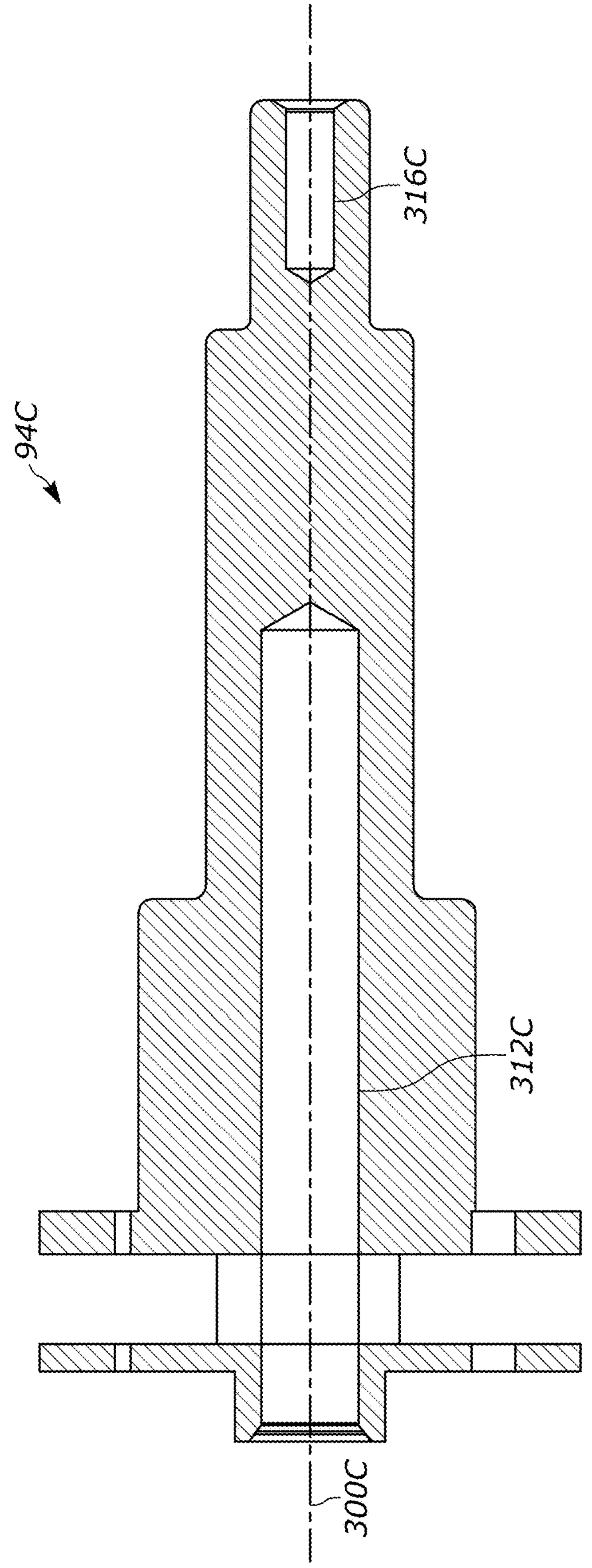
FIG. 6 is a cross-sectional view of a camshaft according to another embodiment and usable with the drive assembly of FIG. 3.

With reference to FIG. 6, a camshaft 94C includes a first blind bore 312C opening at the rear end of the camshaft 94C (i.e. the end closer to the motor 42) and a second blind bore 316C opening at the front end of the camshaft 94C. Removing material from the camshaft 94C by forming the bores 312C, 316C advantageously reduces the mass of the camshaft 94C. In the illustrated embodiment, the camshaft 94C has a mass between 0.6 kg and 0.8 kg. The first blind bore 312C also accommodates the helical pinion 82 (FIG. 2A) and communicates with the planet gears 86.

Figure 7:
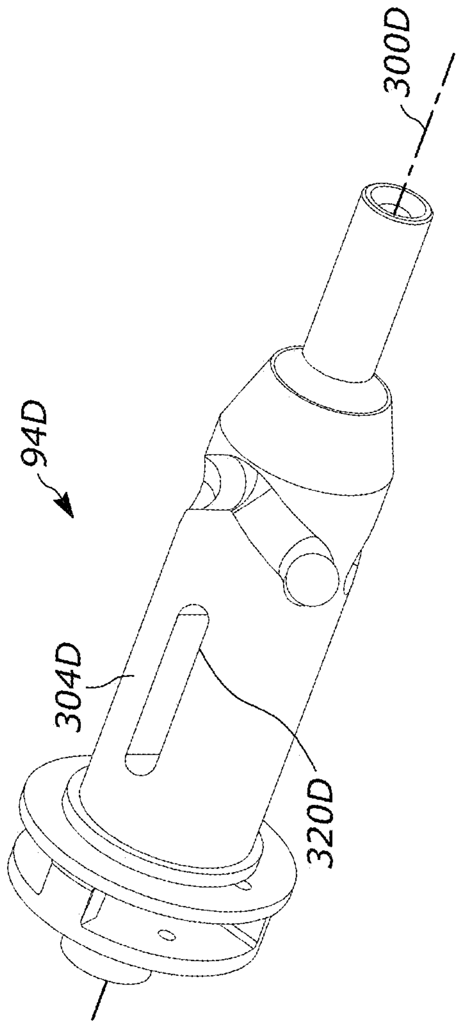
FIG. 7 is a perspective view of a camshaft according to another embodiment and usable with the drive assembly of FIG. 3.
Figure 8:
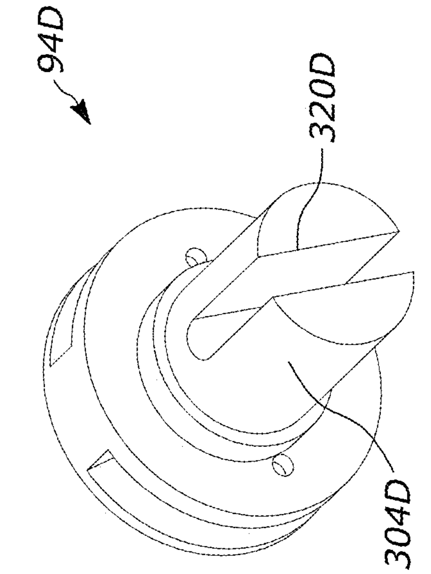
FIG. 8 is a cross-sectional view of the camshaft of FIG. 7.
Figure 9:
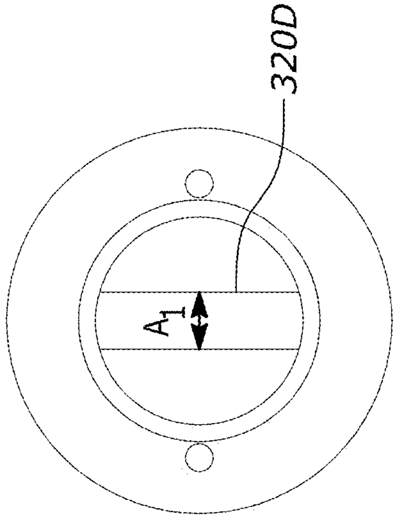
FIGS. 9 and 10 are cross-sectional views of the camshaft of FIG. 7, illustrating different widths of a slot in the camshaft.
Figure 10:
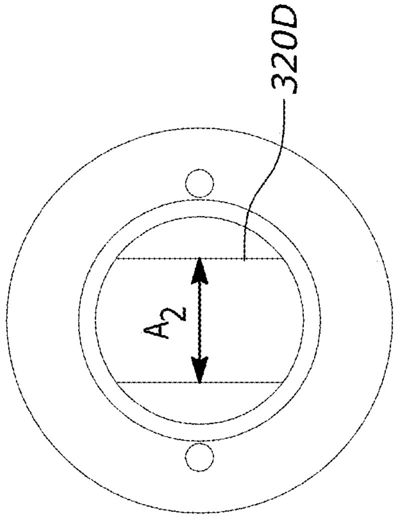

With reference to FIGS. 7 and 8, a camshaft 94D includes a slot 320D extending through the travel portion 304D of the camshaft 94D in a direction transverse to the longitudinal axis 300D. In the illustrated embodiment, the slot 320D is elongated in a direction parallel to the longitudinal axis 300D and extends entirely through the camshaft 94D. In other embodiments, the slot 320D may be a blind slot, and the slot 320D may be one of a plurality of slots 320D. Removing material from the camshaft 94D by forming the slot 320D advantageously reduces the mass of the camshaft 94D. With reference to FIGS. 9 and 10, a width A1, A2 of the slot 320D may be varied to provide a desired mass and part strength. During operation, the hammer 204 can translate over the slot 320D without affecting movement or support of the hammer 204.

Figure 11:
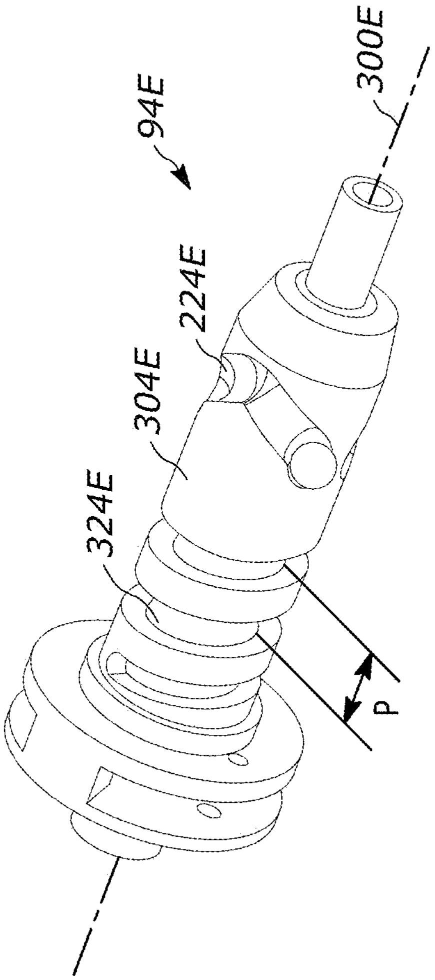
FIG. 11 is a perspective view of a camshaft according to another embodiment and usable with the drive assembly of FIG. 3.
Figure 13:
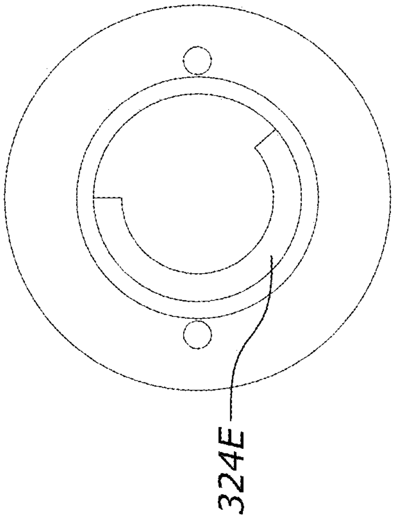
FIGS. 12 and 13 are cross-sectional views of the camshaft of FIG. 11, illustrating different pitches of a helical groove in the camshaft.
Figure 12:
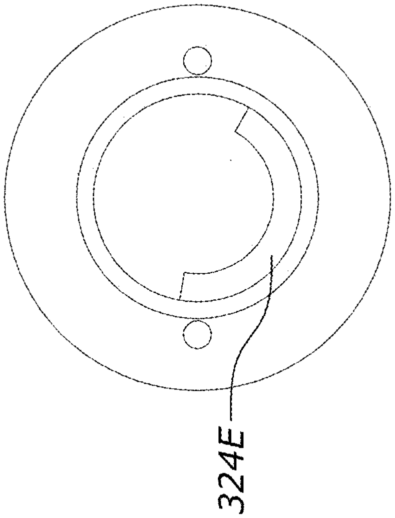

With reference to FIG. 11, a camshaft 94E includes a helical groove 324E formed in the outer surface of the travel portion 304E. The helical groove 324E defines a pitch P such that the hammer 204 can translate over the groove 324E without affecting movement or support of the hammer 204. Removing material from the camshaft 94E by forming the groove 324E advantageously reduces the mass of the camshaft 94E. With reference to FIGS. 12 and 13, the pitch P of the helical groove 324E may be varied to provide a desired mass and part strength. For example, a helical groove 324E with a greater pitch P (FIG. 12) will remove less material than a helical groove 324E with a lesser pitch P (FIG. 13).

Figure 14:
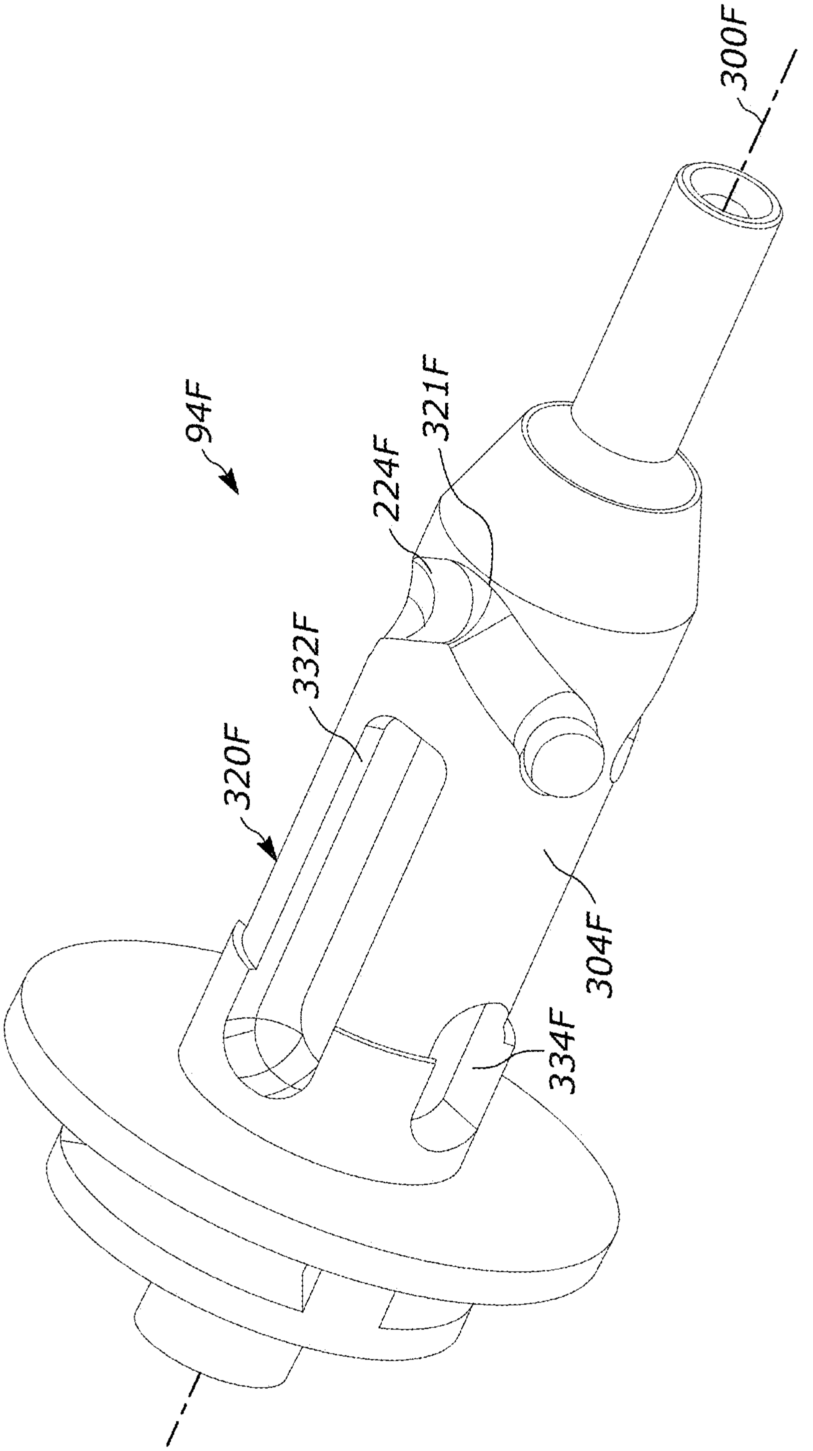
FIG. 14 is a perspective view of a camshaft according to another embodiment and usable with the drive assembly of FIG. 3.

With reference to FIG. 14, a camshaft 94F includes a plurality of slots 320F extending into the travel portion 304F of the camshaft 94F in a direction transverse to the longitudinal axis 300F. In the illustrated embodiment, each of the slots 320F is elongated in a direction parallel to the longitudinal axis 300F and is a blind slot that does not extend entirely through the camshaft 94F. The plurality of slots 320F may include a first slot 332F and a second slot 334F. The first slot 332F is aligned with an apex 321F of the cam groove 224F. As such the first slot 332F can be longer than the second slot 334F without interfering with the cam groove 224F or the support or movement of the hammer 204. Removing material from the camshaft 94F by forming the slots 320F advantageously reduces the mass of the camshaft 94F. In the illustrated embodiment, the camshaft 94F has a mass between 0.6 kg and 0.7 kg.

Figure 15:
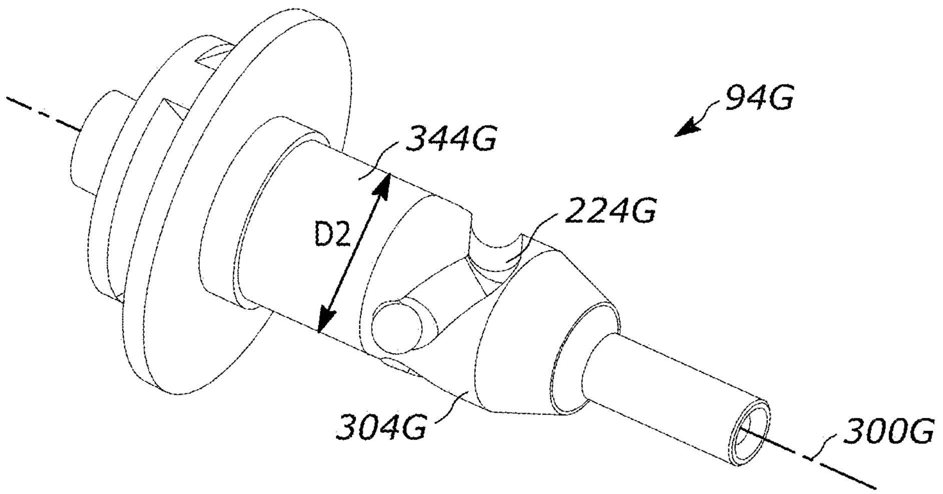
FIG. 15 is a perspective view of a camshaft according to another embodiment and usable with the drive assembly of FIG. 3.
Figure 16:
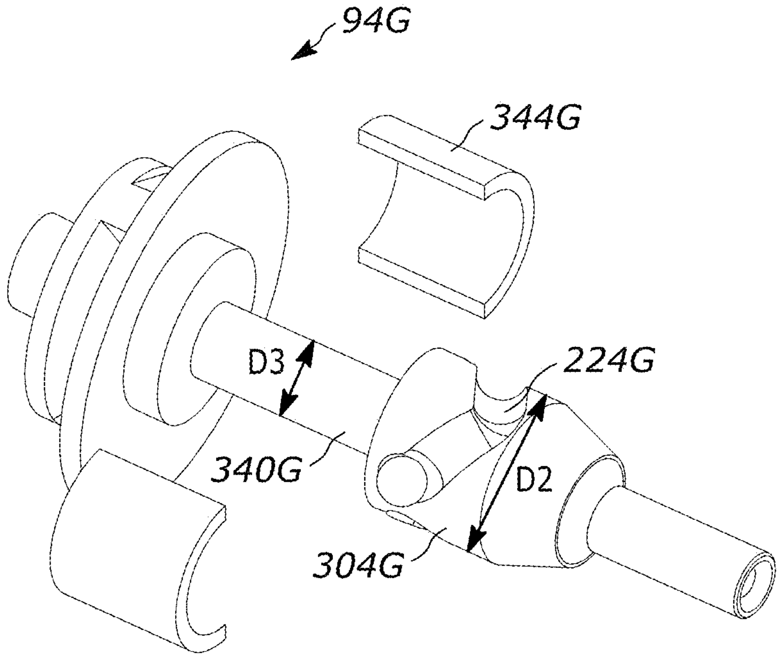
FIG. 16 is an exploded view of the camshaft of FIG. 15.

Referring to FIGS. 15 and 16, a camshaft 94G includes a recessed portion 340G (FIG. 16) having a diameter D3 that is less than the diameter D2 of the remainder of the travel portion 304G. A lightweight sleeve 344G surrounds the recessed portion 340G. The sleeve 344G is made of a material that is less dense than the remainder of the camshaft 94G. For example, in some embodiments, the sleeve 344G may be made of a polymer material overmolded on the recessed portion 340G. In such embodiments, the sleeve 344G may be integrally formed around the camshaft 94G. After overmolding, the exterior surface of the sleeve 344G may optionally be machined to provide an outer diameter within a specified tolerance range.

In other embodiments, the sleeve 344G may be assembled over the recessed portion 340G in other ways. For example, with reference to FIG. 16, the sleeve 344G may include two cooperating clamshell halves, which may be adhered or fused together (e.g., by ultrasonic welding). In other embodiments, the sleeve 344G may be made of any other lightweight but rigid material, such as aluminum, magnesium, or titanium. Removing material from the camshaft 94G and replacing it with the lightweight sleeve 344G advantageously reduces the mass of the camshaft 94G. In the illustrated embodiment, the camshaft 94G has a mass between 0.5 kg and 0.6 kg.

The sleeve 344G has an outer diameter that is equal to the diameter D2 of the travel portion 304G. As such, when the sleeve 344G is assembled over the recessed portion 340G, the travel portion 304G extends along the sleeve 344G with a constant diameter D2 (FIG. 15). The recessed portion 340G therefore does not interfere with support or movement of the hammer 204.

Figure 17:
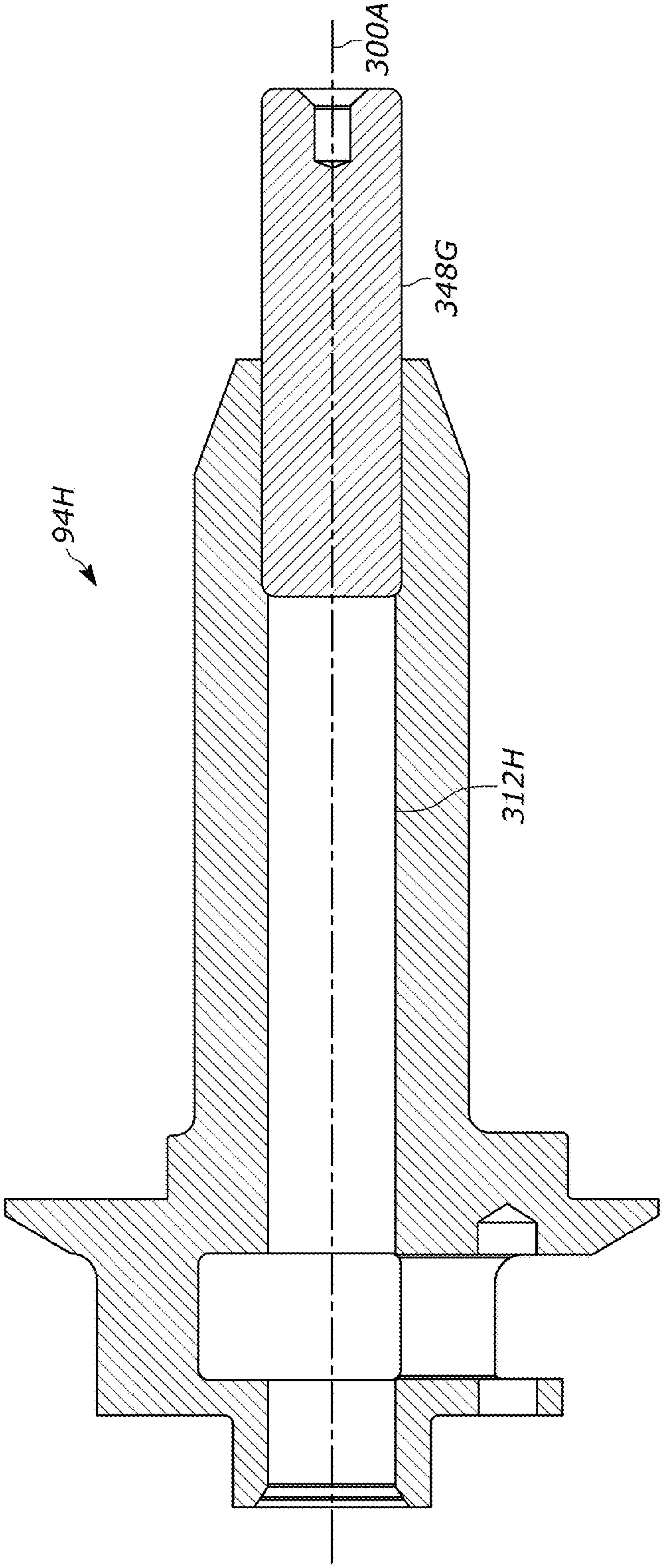
FIG. 17 is a cross-sectional view of a camshaft according to another embodiment and usable with the drive assembly of FIG. 3.

With reference to FIG. 17, a camshaft 94H includes a through bore 312H that extends through the entire length of the camshaft 94H along the longitudinal axis 300A. Removing material from the camshaft 94H by forming the bore 312H advantageously reduces the mass of the camshaft 94H. The bore 312H also accommodates the helical pinion 82 (FIG. 2A) and communicates with the planet gears 86. In the illustrated embodiment, the camshaft 94H has a mass between 0.6 kg and 0.7 kg.

The illustrated camshaft 94H further includes an insert 348G partially received within the bore 312H such that the insert 348G extends from the bore 312H. The insert 348G is configured to be received within the anvil 200 as a piloting feature to rotationally support the front end of the camshaft 94H. In some embodiments, the insert 348G is press-fit within the bore 312H. The insert 348G may alternatively be welded in place, or fixed within the bore 312H by any other suitable means.

In some embodiments, the insert 348G may be made of a different material than the camshaft 94H and/or the anvil 200 (e.g., a less dense material such as aluminum, magnesium, or a composite or polymeric material), as the insert 348G may be subjected to less stress and/or wear than other components of the camshaft 94H or the anvil 200. In some embodiments, the insert 348G may be provided as a part of the anvil 200. That is, the camshaft 94H may be configured to receive a portion of the anvil 200 into the bore 312H in place of the insert 348G.

Figure 18:
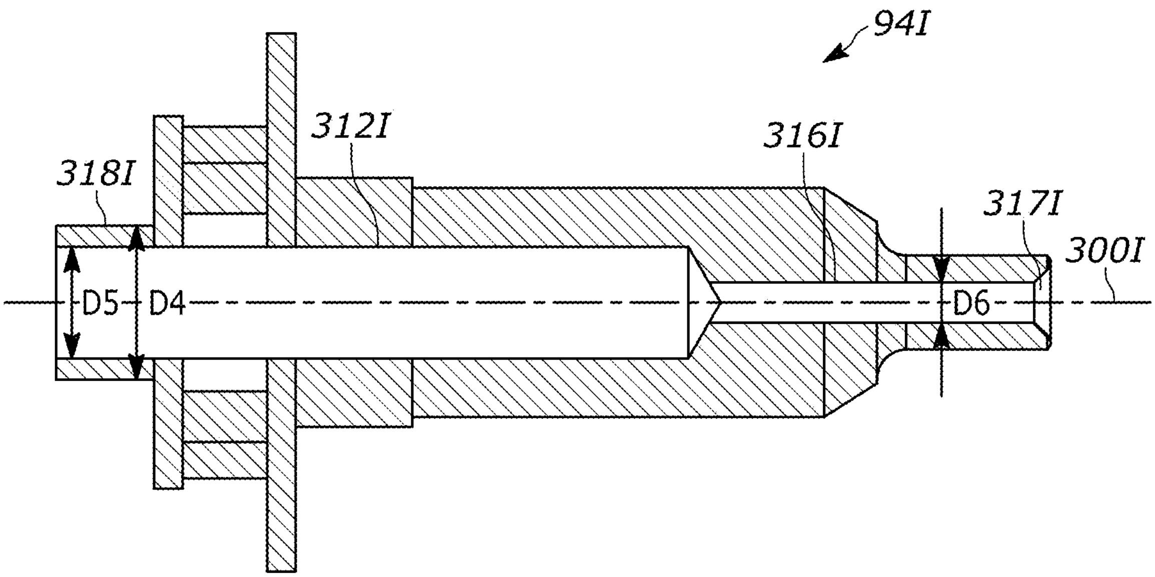
FIG. 18 is a cross-sectional view of a camshaft according to another embodiment and usable with the drive assembly of FIG. 3.

Referring to FIG. 18, a camshaft 94I according to another embodiment includes a first bore 312I extending from the rear end of the camshaft 94I (i.e. the end closer to the motor 42) and a second bore 316I extending from the front end of the camshaft 94I. The first bore 312I and the second bore 316I are coaxial with the longitudinal axis 300I of the camshaft 94I. The first bore 312I intersects the second bore 316I such that the bores 312I, 316I collectively extend the entire length of the camshaft 94I. In the illustrated embodiment, the second bore 316I includes a countersink 317I at the front end of the camshaft 94I.

The camshaft 94I includes a bearing seat 318I adjacent the rear end of the camshaft 94I that receives a bearing to rotationally support the rear end of the camshaft 94I. The bearing seat 318I defines an outer diameter D4. The first bore 312I defines an inner diameter D5, and the second bore 316I defines an inner diameter D6. The inner diameter D5 of the first bore 312I is greater than the inner diameter D6 of the second bore 316I. The difference between the outer diameter D4 of the bearing seat 318I and the inner diameter D5 of the first bore 312I defines a wall thickness of the bearing seat 318I. The inner diameter D5 is limited by the minimum wall thickness of the bearing seat 318I that is required for structural integrity.

Removing material from the camshaft 94I by forming the bores 312I, 316I advantageously reduces the mass of the camshaft 94I. In the illustrated embodiment, the camshaft 94I has a mass of about 0.70 kg. The first bore 312I also accommodates the helical pinion 82 (FIG. 2A) and communicates with the planet gears 86.

Figure 19:
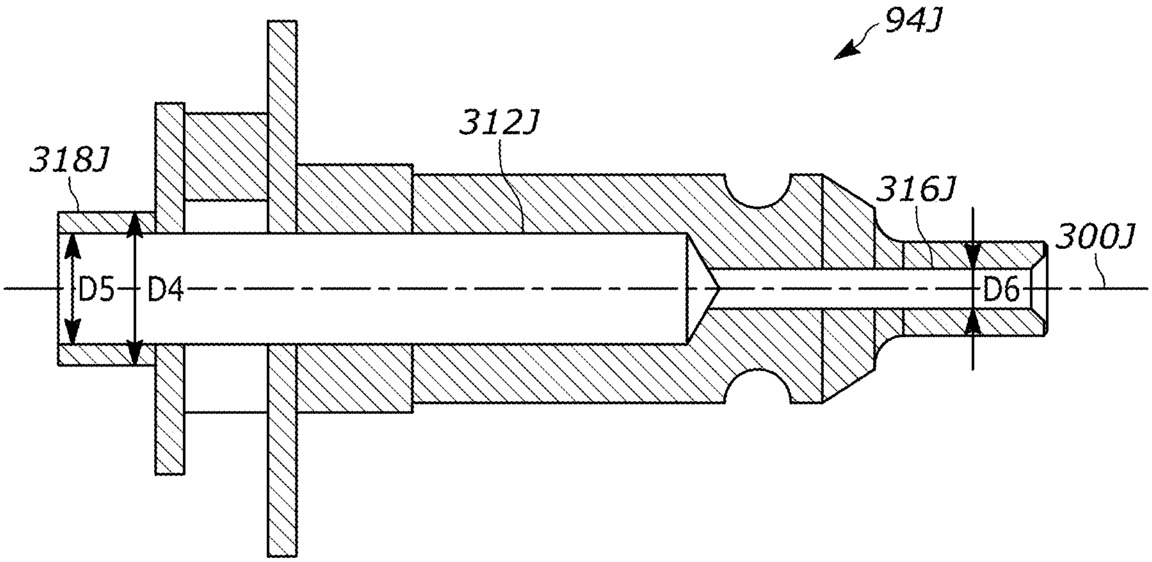
FIG. 19 is a cross-sectional view of a camshaft according to another embodiment and usable with the drive assembly of FIG. 3.

FIG. 19 illustrates a camshaft 94J that is similar to the camshaft 94I, except that the first bore 312J has a larger inner diameter D5, further reducing the mass of the camshaft 94J compared to the camshaft 94I of FIG. 18. In the illustrated embodiment, the camshaft 94J has a mass of about 0.67 kg. The outer diameter D4 of the bearing seat 318J is also larger to maintain the requisite minimum wall thickness of the bearing seat 318J.

Figure 20:
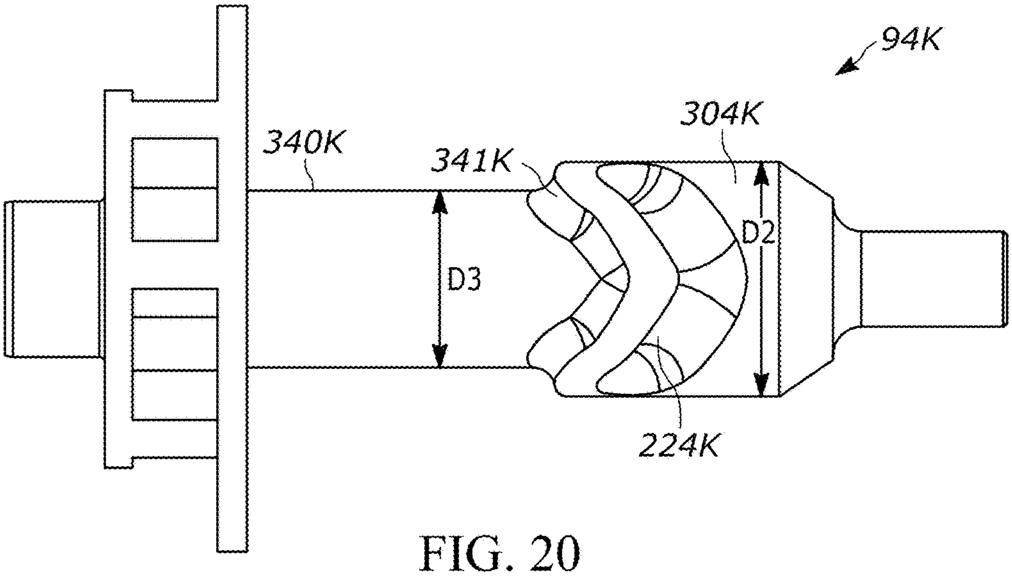
FIG. 20 is a side view of a camshaft according to another embodiment and usable with the drive assembly of FIG. 3.
Figure 21:
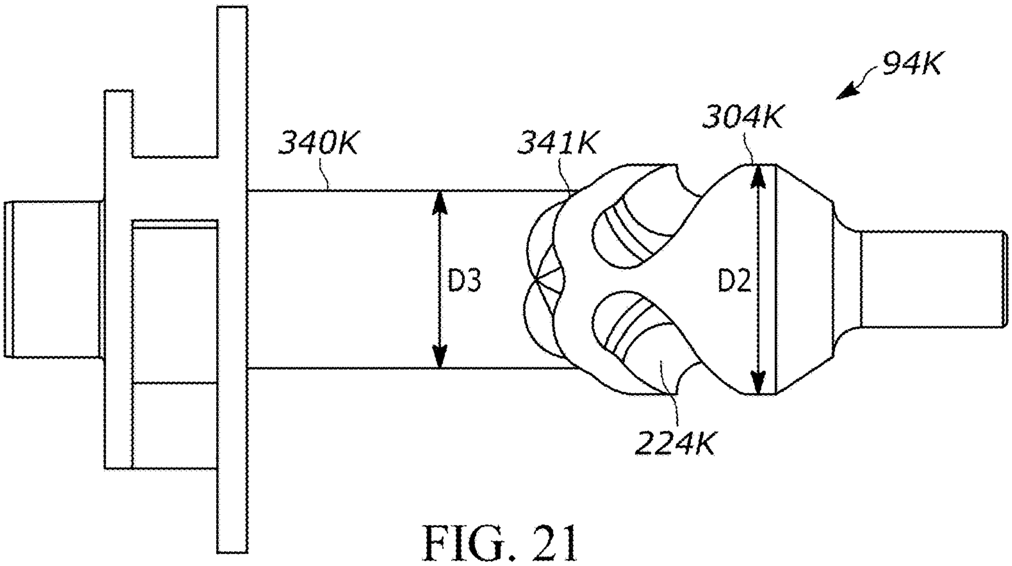
FIG. 21 is another side view of the camshaft of FIG. 20.

FIGS. 20-21 illustrate a camshaft 94K according to another embodiment. The camshaft 94K includes a recessed portion 340K having a diameter D3 that is less than the diameter D2 of the remainder of the travel portion 304K. The recessed portion 340K has a non-linear end profile 341K that generally follows the contour of the cam grooves 224K. This allows for the length of the recessed portion 340K to be maximized, advantageously reducing the mass of the camshaft 94K. In the illustrated embodiment, the camshaft 94K has a mass of about 0.55 kg. In some embodiments, the camshaft 94K may further include a sleeve of lightweight material (not shown) surrounding the recessed portion 40K, such as the sleeve 344G described above with reference to FIGS. 15 and 16.

Figure 22:
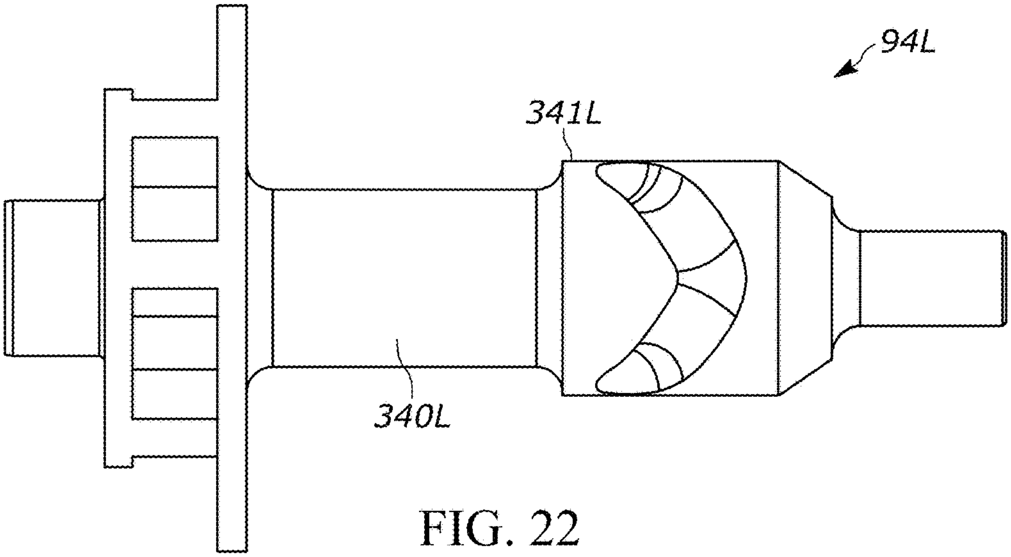
FIG. 22 is a side view of a camshaft according to another embodiment and usable with the drive assembly of FIG. 3.
Figure 23:
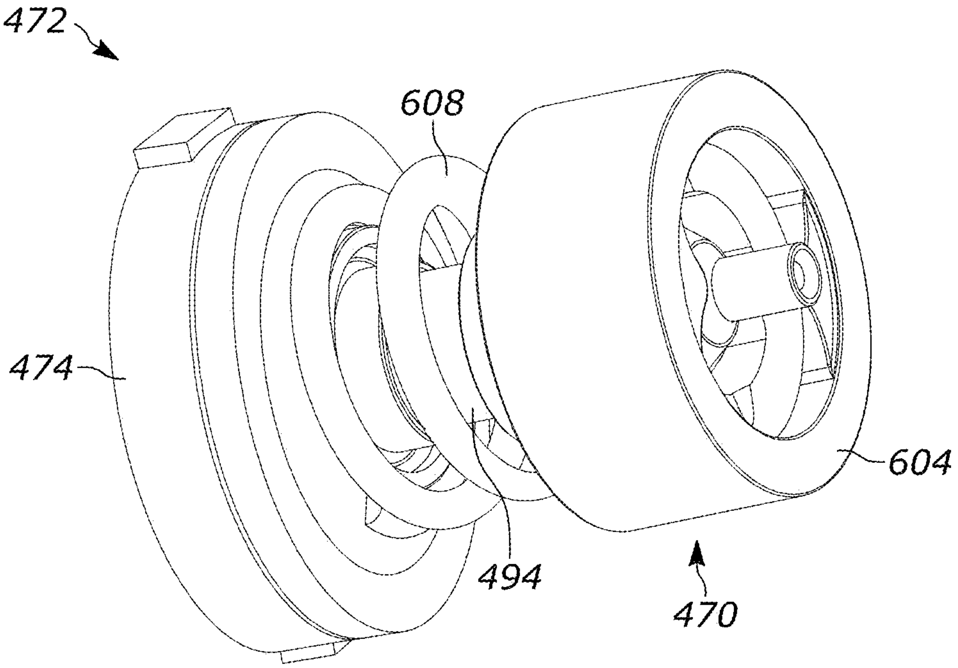
FIG. 23 is a perspective view of a drive assembly for an impact tool according to another embodiment.

FIG. 22 illustrates a camshaft 94L according to another embodiment. The camshaft 94L is similar to the camshaft 94K, except the recessed portion 340L has a generally linear end profile or edge 341L. As such, the recessed portion 340L may be formed via a single turning operation, such that the camshaft 94L may be less costly to machine. In the illustrated embodiment, the camshaft 94L has a mass of about 0.56 kg.

Any of the features, properties, dimensions, and the like of any of the camshafts 94B-94L described and illustrated herein may alternatively be incorporated into any of the other camshafts 94B-94L.

FIGS. 23-28 illustrate a drive assembly 472 according to another embodiment, which may be incorporated into the impact wrench 10 of FIG. 1 or into other impact tools (e.g., impact drivers or impact wrenches). The drive assembly 472 is similar in some aspects to the drive assembly 72 described above with reference to FIG. 2A, and features and elements of the drive assembly 472 corresponding with features and elements of the drive assembly 72 are given corresponding reference numbers plus '400.'

Figure 24:
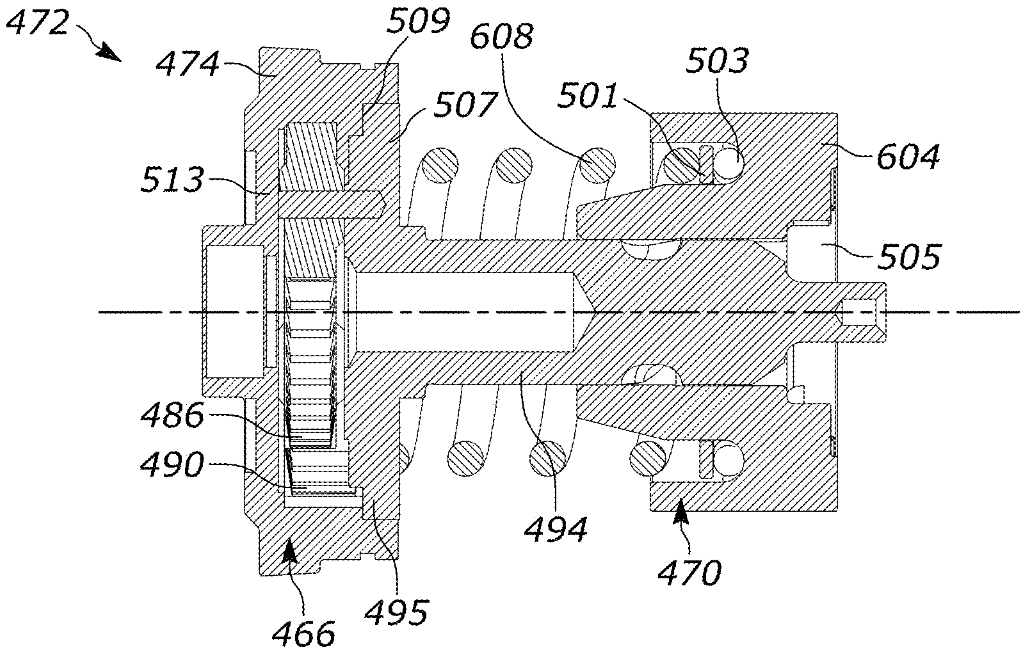
FIG. 24 is a cross-sectional view of the drive assembly of FIG. 23.
Figure 25:
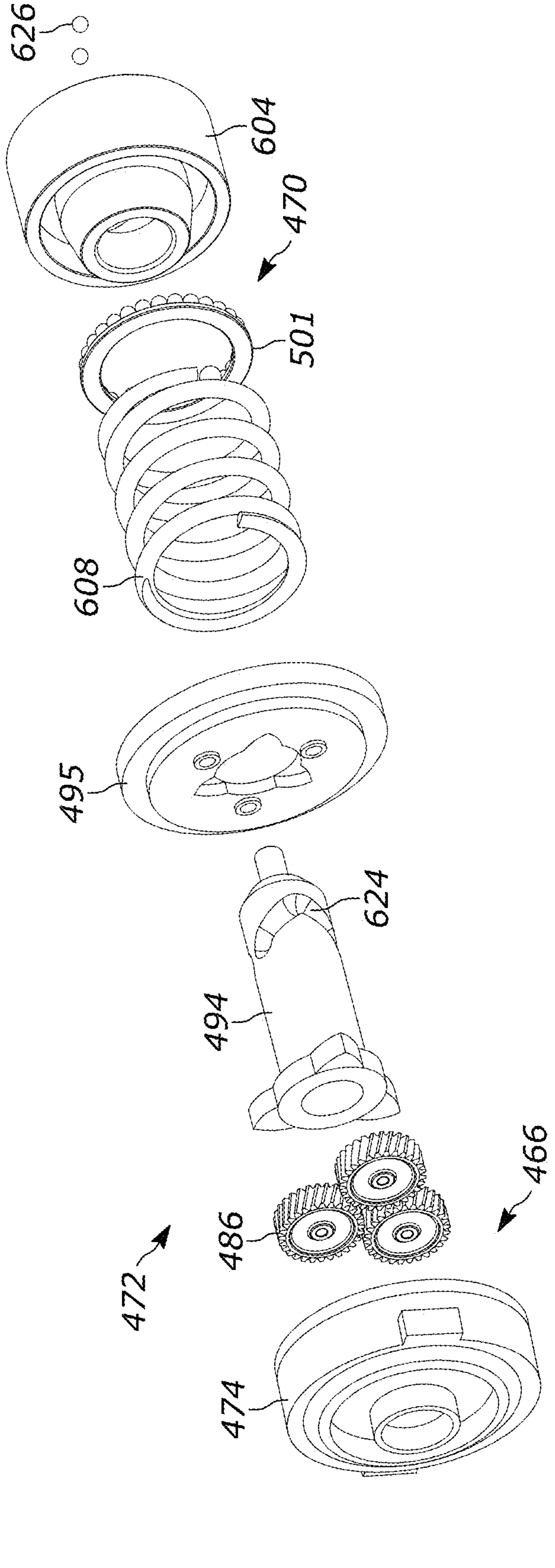
FIG. 25 is an exploded perspective view of the drive assembly of FIG. 23.
Figure 26:
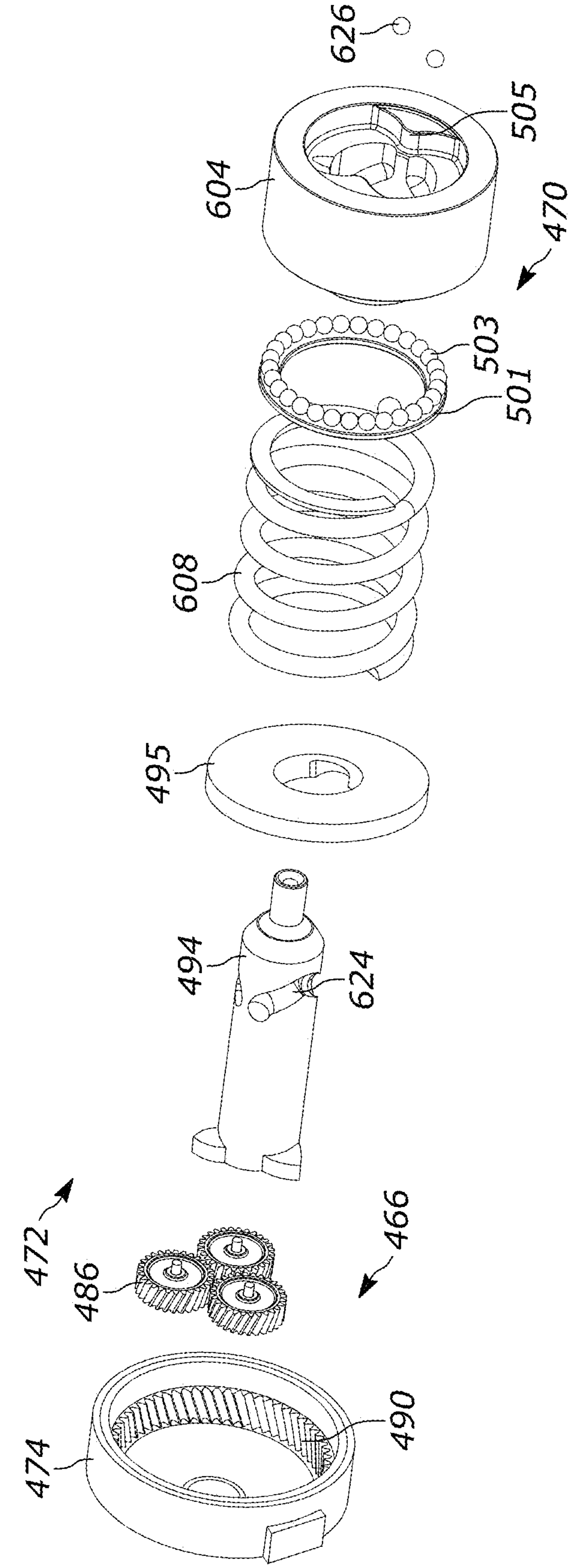
FIG. 26 is another exploded perspective view of the drive assembly of FIG. 23.

With reference to FIGS. 24-26, the drive assembly 472 includes a gear assembly 466 and an impact mechanism 470 coupled to an output of the gear assembly 466. The illustrated gear assembly 466 includes a gear case 474, a plurality of planet gears 486 accommodated within the gear case 474, and a ring gear 490 meshed with the planet gears 486. In the illustrated embodiment, the planet gears 486 are spur gears, but in some embodiments, the planet gears 486 may be helical gears. Spur gears may be advantageous in some embodiments to reduce cost and to eliminate axial thrust loads that are created by helical gears.

In the illustrated embodiment, the ring gear 490 is integrally formed as a single piece with the gear case 474. In some embodiments, the ring gear 490 and the gear case 474 may be made from plastic or metal and integrally formed together using a molding process. In other embodiments, the ring gear 490 may be formed separately and rotationally fixed to the gear case 474. In such embodiments, the ring gear 490 and the gear case 474 may be made from different materials. For example, the ring gear 490 may be made of metal (e.g., powdered metal formed into the ring gear 490 via a compaction and sintering process or any other suitable process), and the gear case 474 may be made of plastic. In some embodiments, the gear case 474 may be molded around the ring gear 490 (e.g., using an insert molding process). In other embodiments, the ring gear 490 and the gear case 474 may be coupled together in other ways (e.g., press-fitting, etc.).

Figure 27:
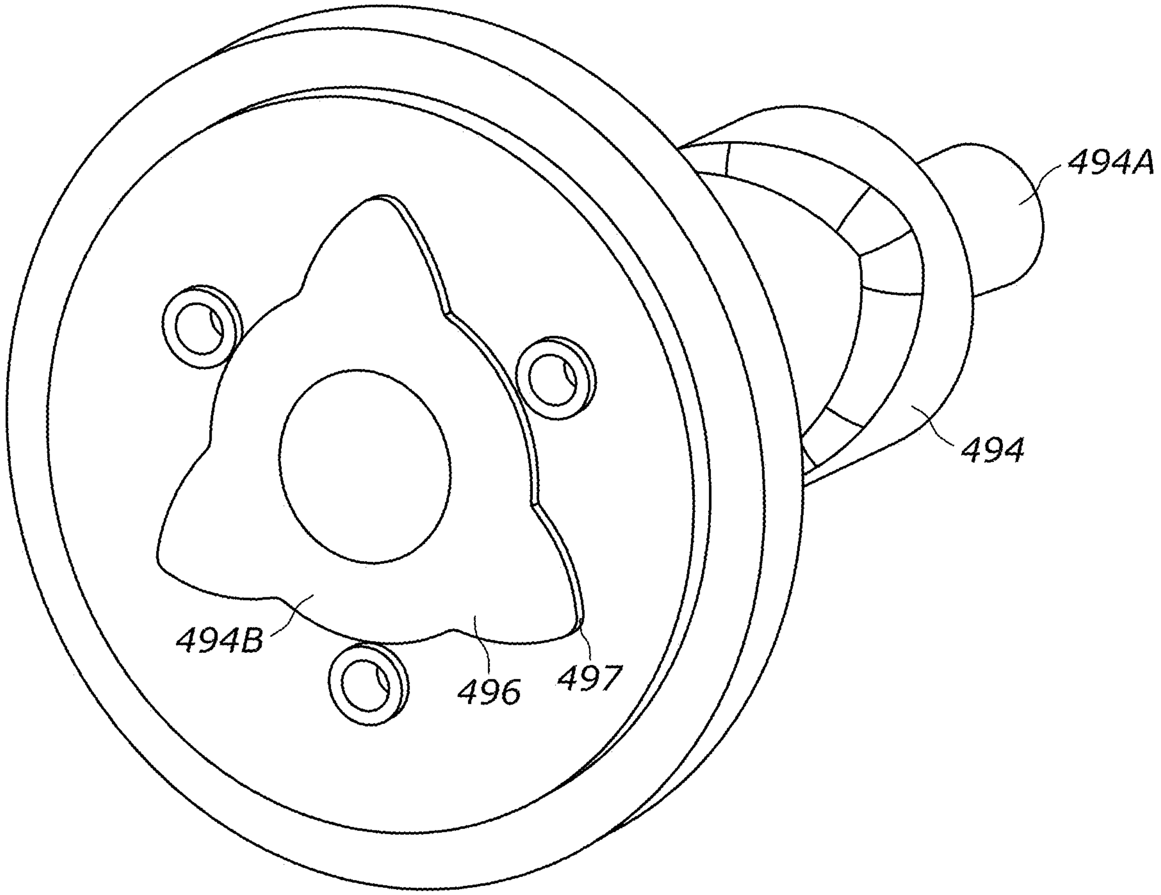
FIG. 27 is a rear perspective view illustrating a camshaft and a carrier of the drive assembly of FIG. 23.
Figure 28:
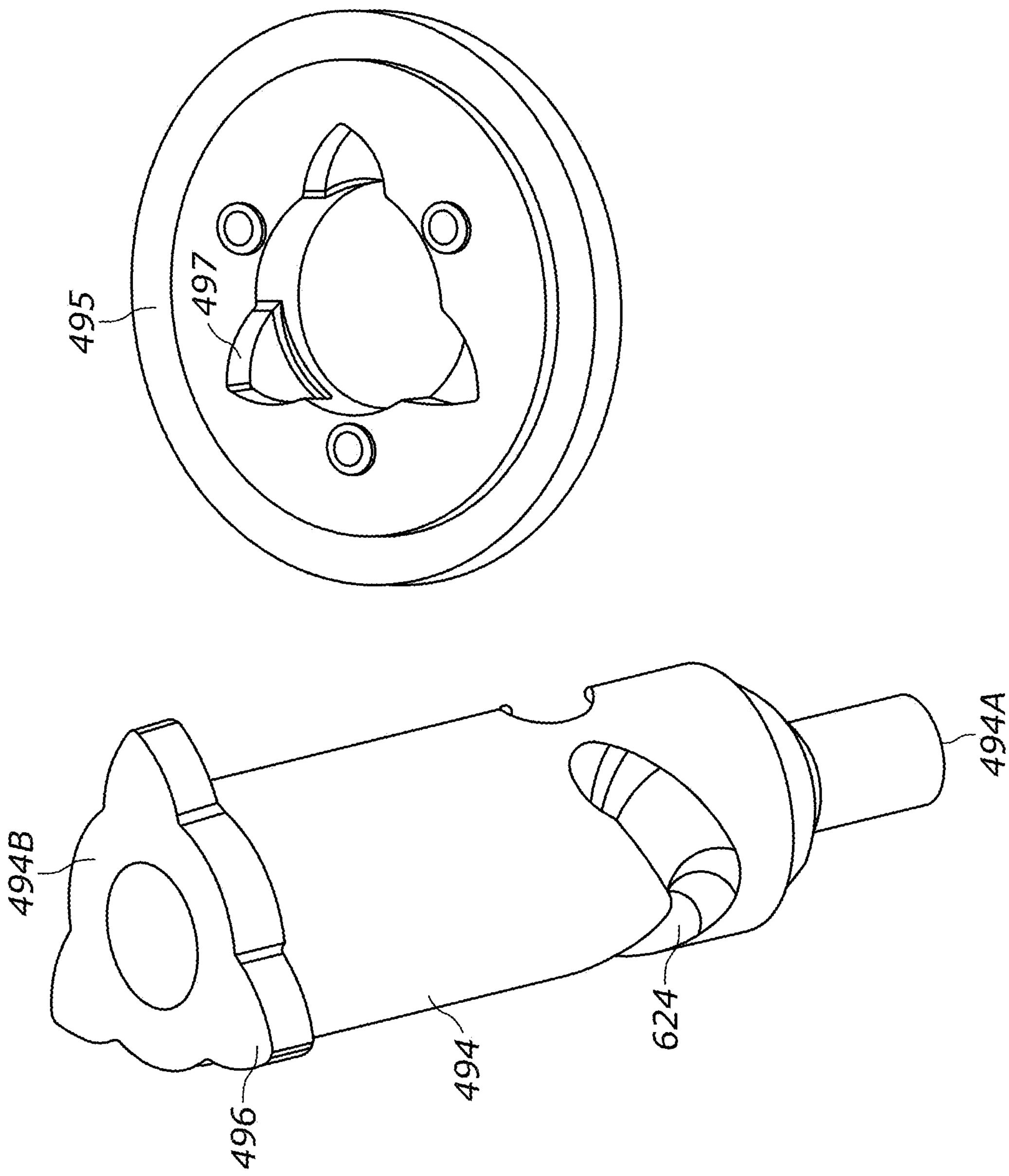
FIG. 28 is an exploded perspective view of the camshaft and carrier of FIG. 27.

The impact mechanism 470 of the drive assembly 472 includes a camshaft 494, a planet carrier 495, an anvil (not shown), a hammer 604, and a spring 608. With reference to FIGS. 27-28, the camshaft 494 includes a front end 494*a* and a rear end 494*b* opposite the front end 494*a*. A plurality of involute lugs 496 extends radially outward adjacent the rear end 494*b*. In the illustrated embodiment, the camshaft 494 includes three lugs 496 equally spaced at 120 degree intervals. In other embodiments, the camshaft 494 may include two lugs 496 or any other number of lugs 496. The planet carrier 495 includes a corresponding plurality of recesses 497 formed in a rear face of the carrier 495.

The recesses 497 receive the lugs 496 to couple the planet carrier 495 and the camshaft 494 together for co-rotation. The planet gears 486 are mounted to the planet carrier 495. Accordingly, when the planet gears 486 rotate, they advance along the inner circumference of the ring gear 490 and rotate the planet carrier 495, which in turn rotates the camshaft 494. Because the planet carrier 495 is formed separately from the camshaft 494, the camshaft 494 advantageously requires fewer machining steps and less material removal to manufacture compared to camshafts having an integrated planet carrier.

With reference to FIG. 24, the impact mechanism 470 is configured to convert a continuous rotational force or torque provided by the gear assembly 466 to a striking rotational force or intermittent applications of torque to the anvil when the reaction torque on the anvil (e.g., due to engagement between a tool element coupled to the anvil and a fastener being worked upon) exceeds a certain threshold. The hammer 604 is supported on and axially slidable relative to the camshaft 494 and the anvil.

The spring 608 extends between the planet carrier 495 and the hammer 604 to bias the hammer 604 forward (i.e. to the right in FIG. 24). In addition, the spring 608 biases the planet carrier 495 rearward to maintain the recesses 497 in engagement with the lugs 496 (FIG. 27). A washer 501 and a plurality of rolling elements 503 are positioned between the spring 608 and the hammer 604 to allow the spring 608 and the camshaft 494 to continue to rotate relative to the hammer 604 after each impact strike when lugs 505 on the hammer 604 engage with corresponding lugs on the anvil and transfer kinetic energy from the hammer 604 to the anvil. The camshaft 494 further includes cam grooves 624 in which corresponding cam balls 626 are received (FIGS. 25-26). The cam balls 626 are in driving engagement with the hammer 604 and movement of the cam balls 626 within the cam grooves 624 allows for relative axial movement of the hammer 604 along the camshaft 494 when the hammer lugs 505 and the anvil lugs are engaged and the camshaft 494 continues to rotate.

With reference to FIG. 24, the illustrated planet carrier 495 is at least partially received within the gear case 474 and defines a front wall of the gear case 474. The planet carrier 495 has an annular wall 507 that is engageable with an annular shoulder 509 in the gear case 474. The spring 608 bears against the front side of the planet carrier 495 and biases the rear facing axial side of the wall 507 into engagement with the shoulder 509. The planet carrier 495 may thus transmit the axial loads directly to the gear case 474. The radial side of the annular wall 507 engages an interior surface of the gear case 474 with a sliding fit. As such, the planet carrier 495 is rotatable relative to the gear case 474 while radially supporting the rear end 494*b* of the camshaft 494. Because the planet carrier 495 both axially and radially supports the camshaft 494, no additional bearing is required. This reduces the cost of the drive assembly 472. In addition, because the planet carrier 495 forms the front wall of the gear case 474, the size and weight of the gear case 474 is reduced.

The planet gears 486 are accommodated in the gear case 474 between the planet carrier 495 and a rear wall 513 of the gear case 474. In the illustrated embodiment, a gap exists between the axial faces of the planet gears 486 and the planet carrier 495 and the rear wall 513, respectively. Therefore, the planet gears 486 are not subjected to compressive forces in the axial direction, and drag on the planet gears 486 is minimized.

Figure 29:
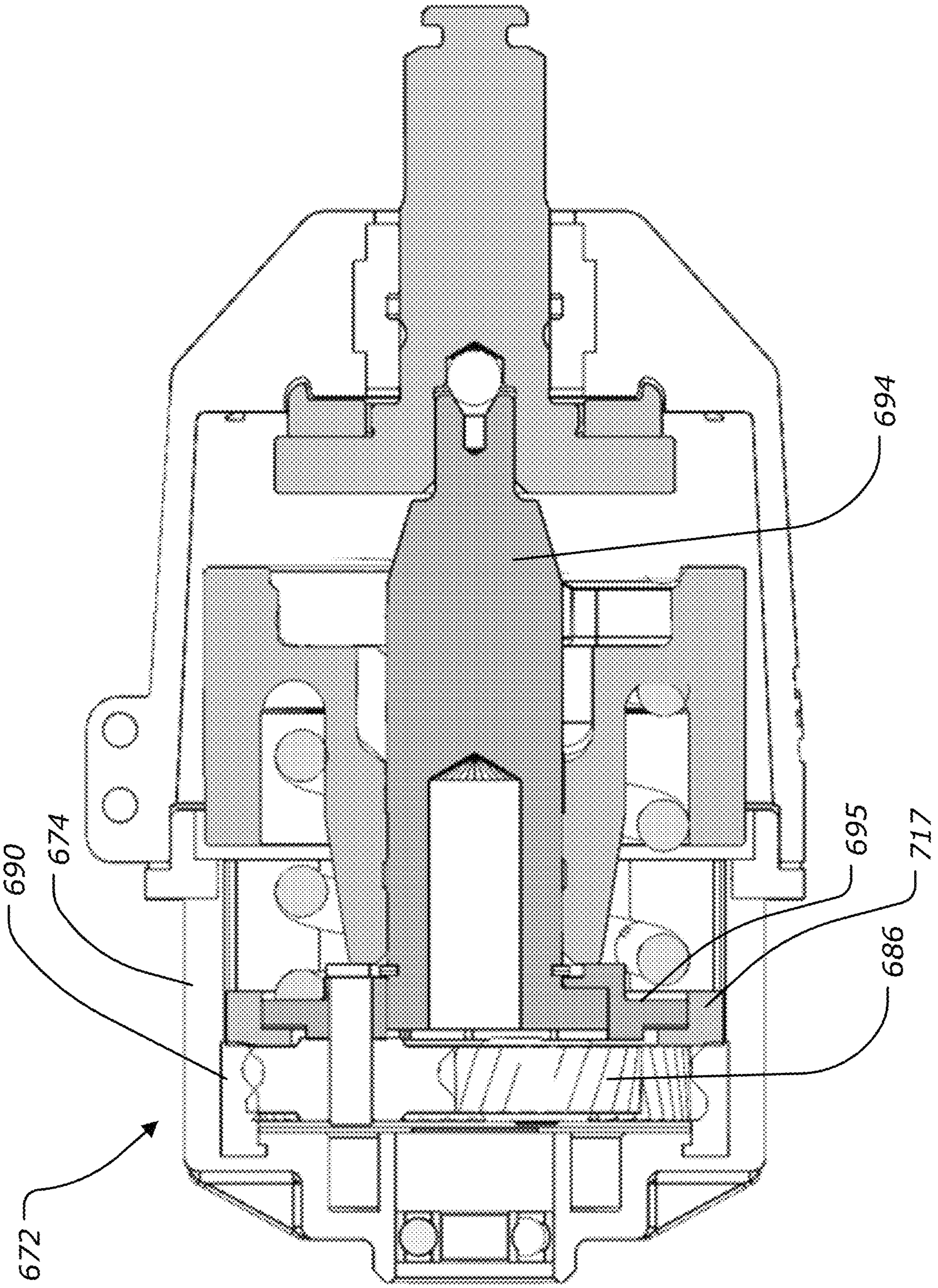
FIG. 29 is a cross-sectional view of a drive assembly for an impact tool according to another embodiment.
Figure 30:
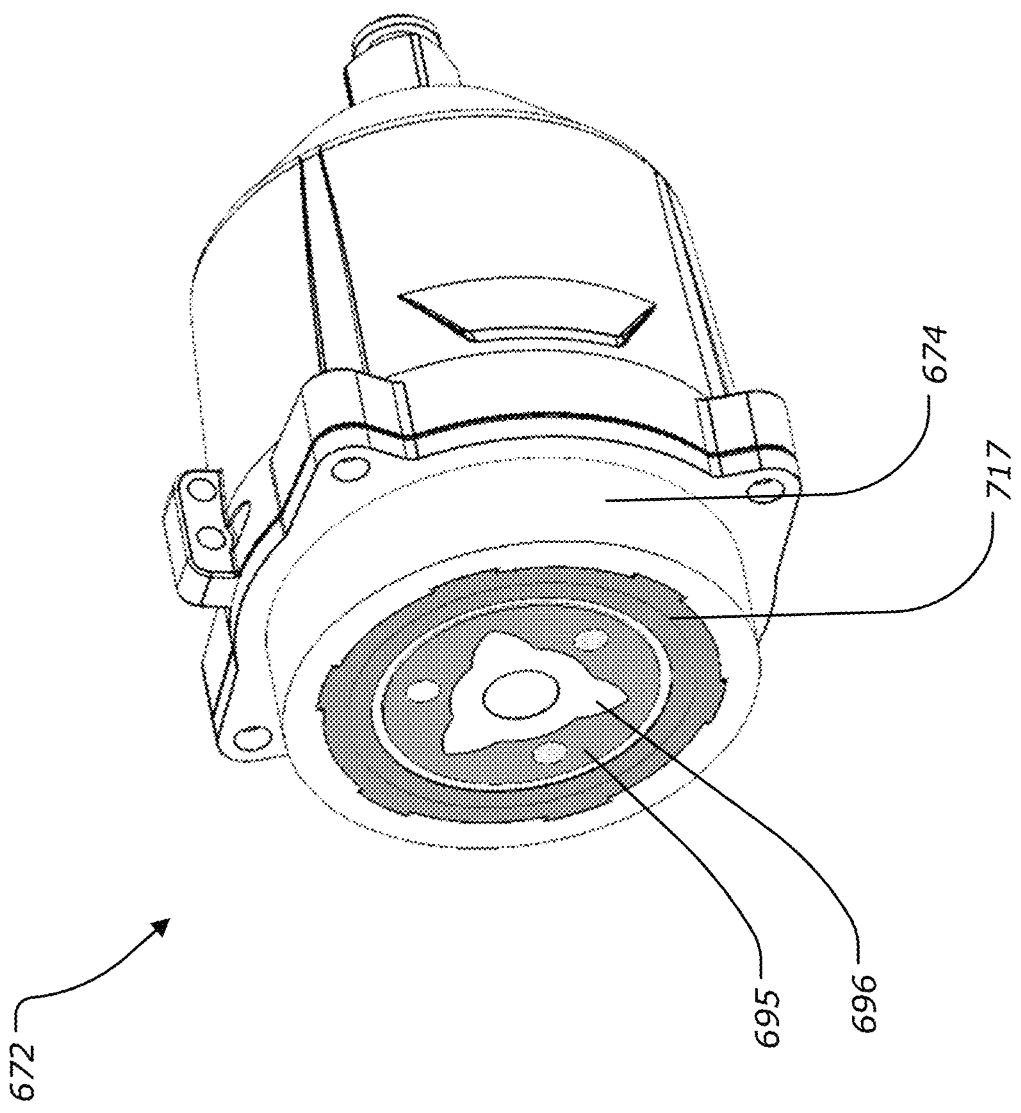
FIG. 30 is another cross-sectional view of the drive assembly of FIG. 29.

FIGS. 29-30 illustrate a drive assembly 672 according to another embodiment, which may be incorporated into the impact wrench 10 of FIG. 1 or into other impact tools (e.g., impact drivers or impact wrenches). The drive assembly 672 is similar in some aspects to the drive assembly 472 described above with reference to FIG. 24-28, and features and elements of the drive assembly 672 corresponding with features and elements of the drive assembly 472 are given corresponding reference numbers plus '200.'

In the illustrated embodiment, the ring gear 690 formed separately from the gear case 674 and rotationally fixed to the gear case 674 (e.g., by a plurality teeth or projections, press-fitting, or the like). The camshaft 694 is coupled for co-rotation with the planet carrier 695 via lugs 696 (FIG. 30). The outer circumference of the planet carrier 695 is rotatably supported by a bushing 717, and the bushing 717 is fixed within the gear case 674 adjacent a front side of the ring gear 690.

Figure 31:
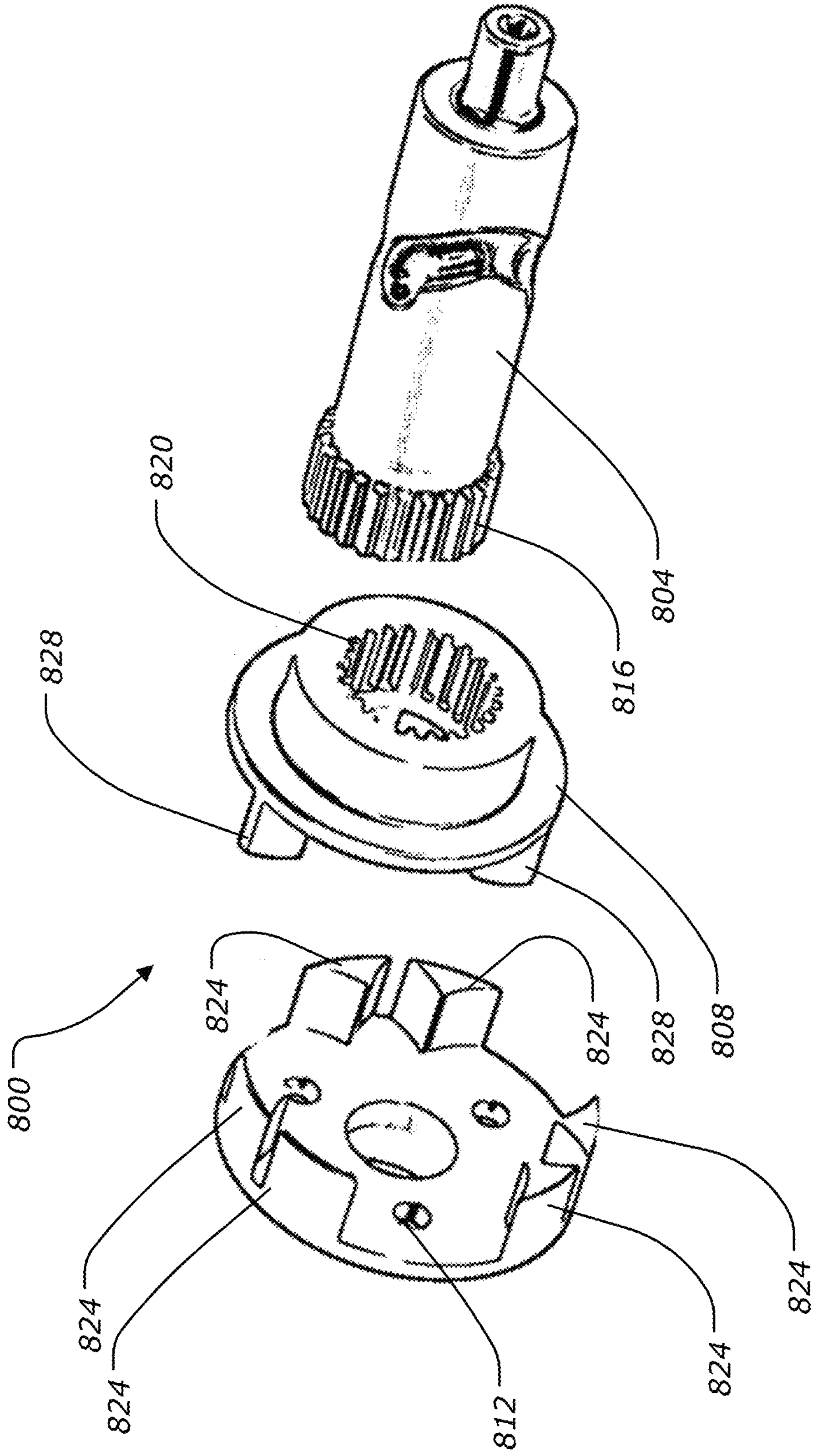
FIG. 31 is an exploded view illustrating a portion of a drive assembly for an impact tool according to another embodiment.

FIG. 31 illustrates a drive assembly 800 according to another embodiment, which may be incorporated into the impact wrench 10 of FIG. 1 or into other impact tools (e.g., impact drivers or impact wrenches).

The drive assembly 800 includes a three-part assembly, with a camshaft 804, a front carrier portion 808, and a rear carrier portion 812. Camshaft 804 includes a plurality of projections or splines 816 that engage with a corresponding plurality of projections or splines 820 in the front carrier portion 808 to couple the camshaft 804 and the front carrier portion 808 together for co-rotation. The rear carrier portion 812 includes a plurality of forwardly-extending projections or teeth 824. The front carrier portion 808 includes corresponding rearwardly-extending projections or teeth 828 that are received between respective teeth 824 of the rear carrier portion 812 to couple the rear carrier portion 812 for co-rotation with the front carrier portion 808. In other embodiments, the front carrier portion 808 and the rear carrier portion 812 may be coupled together in other ways (e.g., via other types of interengaging features).

Because the front carrier portion 808 and the rear carrier portion 812 are formed as separate components, assembly of the planet gears (not shown) between the carrier portions 808, 812 may be accomplished in a simplified manner. In addition, either or both the front carrier portion 808 and the rear carrier portion 812 may be made from different materials than the camshaft 804, allowing for additional weight and/or cost savings.

Figure 32:
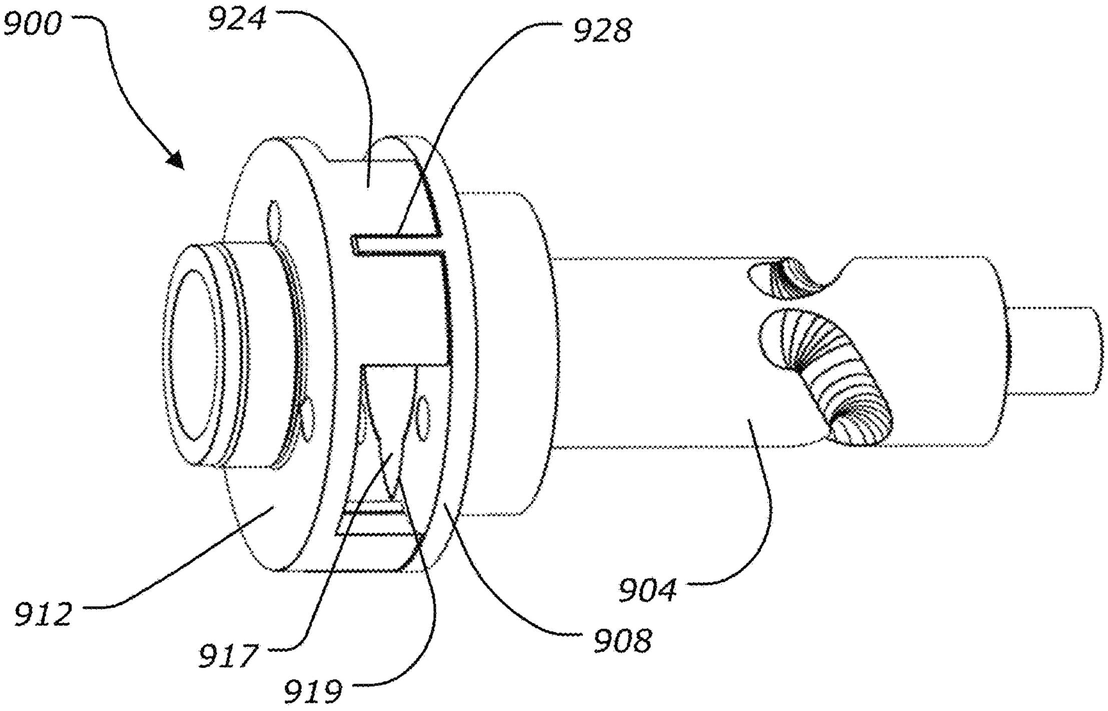
FIG. 32 is a perspective view illustrating a portion of a drive assembly for an impact tool according to another embodiment.

FIG. 32 illustrates a drive assembly 900 according to another embodiment, which may be incorporated into the impact wrench 10 of FIG. 1 or into other impact tools (e.g., impact drivers or impact wrenches). The drive assembly 900 is similar to the drive assembly 800 described above with reference to FIG. 31, and features and elements of the drive assembly 900 corresponding with features and elements of the drive assembly 800 are given like reference numbers plus '100.'

The front carrier portion 908 in the illustrated embodiment is coupled to the camshaft 904 via a plurality of projections or lugs 917 on the camshaft 904 (e.g., similar to the lugs 496 described above) that are received in corresponding recesses 919 in the front carrier portion 908.

Figure 33:
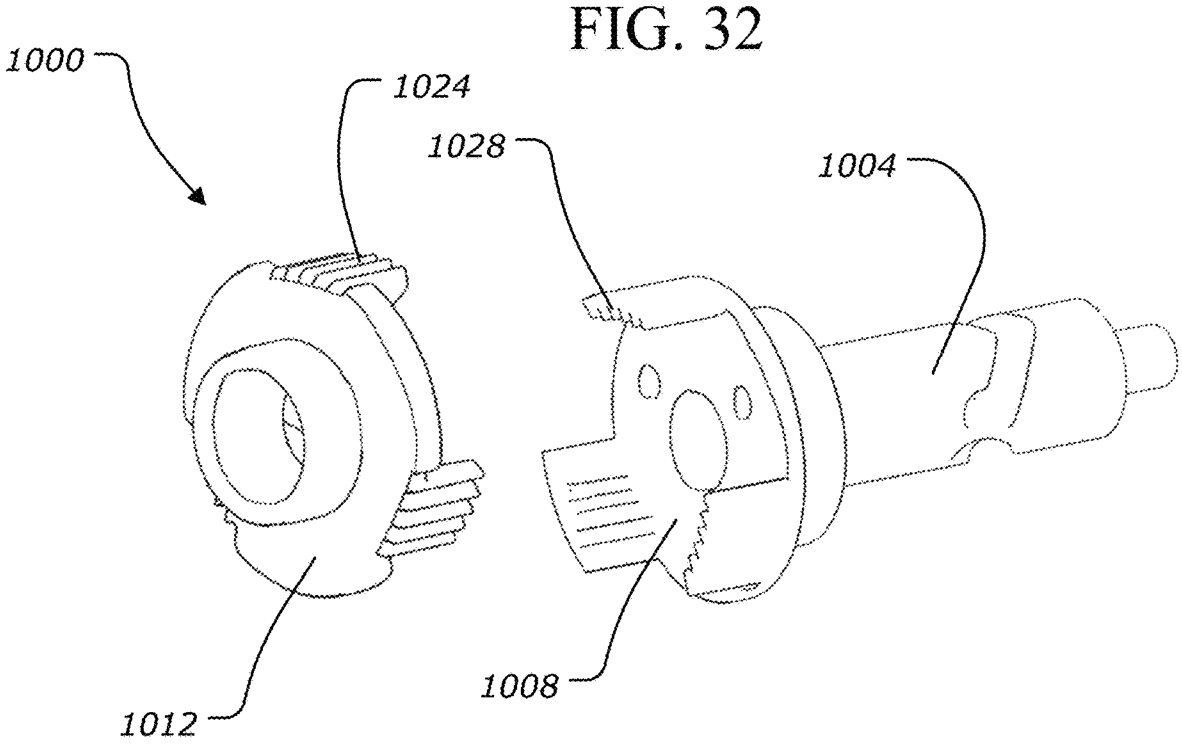
FIG. 33 is an exploded view illustrating a portion of a drive assembly for an impact tool according to another embodiment.

FIG. 33 illustrates a drive assembly 1000 according to another embodiment, which may be incorporated into the impact wrench 10 of FIG. 1 or into other impact tools (e.g., impact drivers or impact wrenches). The drive assembly 1000 is similar to the drive assembly 800 described above with reference to FIG. 31, and features and elements of the drive assembly 1000 corresponding with features and elements of the drive assembly 800 are given like reference numbers plus '200.'

The front carrier portion 1008 in the illustrated embodiment is integrally formed as a part of the camshaft 1004. In addition, the teeth 1024, 1028 are formed as spline segments spaced about the periphery of the rear carrier portion 1012 and the front carrier portion 1008. In the illustrated embodiment, the teeth 1024 on the rear carrier portion 1012 are oriented radially outwardly, and the teeth 1028 on the front carrier portion 1008 are oriented radially inwardly. In other embodiments, this arrangement may be reversed.

Although the invention has been described in detail with reference to certain preferred embodiments, variations and modifications exist within the scope and spirit of one or more independent aspects of the invention as described.

Various features of the invention are set forth in the following claims.

What is claimed is:

1. An impact tool comprising:
- a housing including a motor housing portion, a handle portion extending from the motor housing portion, and a front housing coupled to the motor housing portion;
- a motor supported within the motor housing portion;
- a battery pack supported by the handle portion for providing power to the motor, the battery pack having a nominal capacity of five Amp-hours (Ah) and a nominal output voltage of at least 18 Volts (V); and
- a drive assembly supported at least partially within the front housing and configured to convert continuous torque from the motor to consecutive rotational impacts upon a workpiece capable of developing at least 1,700 ft-lbs of fastening torque, the drive assembly including
  - a camshaft driven by the motor for rotation about an axis,
  - an anvil extending from the front housing, and
  - a hammer configured to reciprocate along a travel portion of the camshaft between a rearmost position and a forwardmost position to deliver rotational impacts to the anvil in response to rotation of the camshaft.

2. The impact tool of claim 1, wherein the drive assembly is configured to convert continuous torque from the motor to consecutive rotational impacts upon a workpiece capable of developing at least 1,800 ft-lbs of fastening torque.

3. The impact tool of claim 2, wherein the drive assembly is configured to convert continuous torque from the motor to consecutive rotational impacts upon a workpiece capable of developing at least 1,900 ft-lbs of fastening torque.

4. The impact tool of claim 3, wherein the drive assembly is configured to convert continuous torque from the motor to consecutive rotational impacts upon a workpiece capable of developing at least 2,000 ft-lbs of fastening torque.

5. The impact tool of claim 4, wherein the drive assembly is configured to convert continuous torque from the motor to consecutive rotational impacts upon a workpiece capable of developing at least 3,500 ft-lbs of fastening torque.

6. The impact tool of claim 4, wherein the drive assembly is configured to convert continuous torque from the motor to consecutive rotational impacts upon a workpiece capable of developing at least 2,000 ft-lbs of fastening torque without exceeding 80 Amps (A) of current drawn by the motor.

7. An impact wrench comprising:
- a brushless motor including an output shaft;
- an impact mechanism, which is rotated by the output shaft;
- an anvil, which is impacted by the impact mechanism; and
- a battery receptacle configured to receive a battery;
- wherein the impact mechanism is capable of delivering a fastening torque through the anvil of 2,000 ft-lbs or more.

8. The impact wrench of claim 7, wherein the impact mechanism is capable of delivering a fastening torque through the anvil of 3,500 ft-lbs or more.

9. The impact wrench of claim 7, further comprising a speed-reducing mechanism, which reduces the speed of the rotation of the output shaft and transmits such rotation to the impact mechanism.

10. The impact wrench of claim 9, wherein the speed-reducing mechanism is a gear assembly providing a gear ratio between 10:1 and 14:1.

11. The impact wrench of claim 7, wherein the impact mechanism includes a camshaft, and wherein a mass of the camshaft is between 0.5 kg and 1.0 kg.

12. The impact wrench of claim 11, wherein the mass of the camshaft is between 0.5 kg and 0.7 kg.

13. The impact wrench of claim 7, wherein the anvil includes a 1-inch square drive end.

14. The impact wrench of claim 7, wherein the battery has a nominal output voltage of 18 V or more.

15. The impact wrench of claim 14, wherein the battery has a nominal capacity of 5 Ah or more.

16. The impact wrench of claim 7, wherein the impact wrench is configured such that an electric current supplied to the brushless motor is 80 A or less.

17. The impact wrench of claim 7, wherein the impact mechanism provides between 40 and 73 joules of energy to the anvil per impact.

18. The impact wrench of claim 7, further comprising a housing including a handle portion having a grip that can be grasped by a user operating the impact wrench; and an auxiliary handle assembly coupled to the housing.

19. The impact wrench of claim 7, wherein the impact mechanism includes a camshaft, a hammer, and a spring biasing the hammer toward the anvil, wherein the hammer is configured to reciprocate along a travel portion of the camshaft between a rearmost position and a forwardmost position to deliver rotational impacts to the anvil in response to rotation of the camshaft, wherein the camshaft has a mass between 0.5 kilograms and 1.0 kilograms, wherein the travel portion of the camshaft has a diameter of at least 25 millimeters, and wherein an axial distance between the forwardmost position and the rearmost position is at least 20.75 millimeters.

20. An impact wrench comprising:
- a brushless motor including an output shaft;
- an impact mechanism, which is rotated by the output shaft;
- an anvil, which is impacted by the impact mechanism; and
- a battery receptacle configured to receive a battery;
- wherein the impact mechanism is capable of delivering a fastening torque through the anvil of 2,000 ft-lbs or more without exceeding 80 A of current drawn by the brushless motor.

* * * * *